(12) United States Patent
Hettinger et al.

(10) Patent No.: US 10,208,623 B2
(45) Date of Patent: Feb. 19, 2019

(54) TURBOCHARGER BEARING ASSEMBLY

(71) Applicant: GARRETT TRANSPORTATION I INC, Torrance, CA (US)

(72) Inventors: Raphaël Hettinger, La (FR); Raphaël Boileau, Th (FR); Fréderic Daguin, Ep (FR)

(73) Assignee: Garrett Transportation I Inc., Torrance, CA (US)

( * ) Notice: Subject to any disclaimer, the term of this patent is extended or adjusted under 35 U.S.C. 154(b) by 321 days.

(21) Appl. No.: 15/095,089

(22) Filed: Apr. 10, 2016

(65) Prior Publication Data

US 2016/0298491 A1    Oct. 13, 2016

Related U.S. Application Data

(60) Provisional application No. 62/146,344, filed on Apr. 12, 2015.

(51) Int. Cl.
*F16C 27/04* (2006.01)
*F01D 25/18* (2006.01)
(Continued)

(52) U.S. Cl.
CPC ............ *F01D 25/18* (2013.01); *F01D 25/16* (2013.01); *F01D 25/162* (2013.01); *F02C 6/12* (2013.01);
(Continued)

(58) Field of Classification Search
CPC ...... F16C 19/18; F16C 19/184; F16C 19/548; F16C 25/08; F16C 25/083; F16C 27/045;
(Continued)

(56) References Cited

U.S. PATENT DOCUMENTS

| 3,017,230 A | 1/1962 | Meermans |
|---|---|---|
| 3,637,271 A | 1/1972 | Bayard |

(Continued)

FOREIGN PATENT DOCUMENTS

| CN | 201771556 U | 3/2011 |
|---|---|---|
| EP | 2530254 A2 | 12/2012 |

(Continued)

OTHER PUBLICATIONS

PCT International Search Report / Written Opinion, PCT/US2014/041001, dated Oct. 7, 2014 (11 pages).

(Continued)

*Primary Examiner* — Phillip A Johnson
(74) *Attorney, Agent, or Firm* — Brian J. Pangrle

(57) ABSTRACT

An assembly can include a turbocharger center housing that includes a through bore that extends between a compressor end and a turbine end of the turbocharger center housing where the through bore includes a sleeve mating surface; and a sleeve positioned at least in part in the through bore of the turbocharger center housing where the sleeve includes an outer mating surface, an inner compressor side bearing lubricant film formation surface disposed at a first radius, an inner turbine side bearing lubricant film formation surface disposed at a second radius, and a surface between the inner compressor side bearing lubricant film formation surface and the inner turbine side bearing lubricant film formation surface that includes a third radius that is less than the first radius and less than the second radius and where outer mating surface of the sleeve contacts the sleeve mating surface of the turbocharger center.

25 Claims, 18 Drawing Sheets

(51) Int. Cl.
*F01D 25/16* (2006.01)
*F04D 29/053* (2006.01)
*F04D 29/056* (2006.01)
*F04D 29/059* (2006.01)
*F04D 29/063* (2006.01)
*F02C 6/12* (2006.01)
*F16C 35/077* (2006.01)
*F16C 25/08* (2006.01)
*F04D 29/42* (2006.01)
*F02B 37/00* (2006.01)
*F16C 19/16* (2006.01)
*F16C 19/54* (2006.01)

(52) U.S. Cl.
CPC ......... *F04D 29/053* (2013.01); *F04D 29/059* (2013.01); *F04D 29/0563* (2013.01); *F04D 29/063* (2013.01); *F16C 25/083* (2013.01); *F16C 35/077* (2013.01); *F02B 37/00* (2013.01); *F04D 29/4206* (2013.01); *F05D 2220/40* (2013.01); *F05D 2260/38* (2013.01); *F16C 19/163* (2013.01); *F16C 19/548* (2013.01); *F16C 2360/24* (2013.01)

(58) Field of Classification Search
CPC .... F16C 35/077; F16C 2360/24; F01D 25/16; F01D 25/162; F01D 25/18; F04D 29/056; F04D 29/0563; F04D 29/059; F02C 6/12
See application file for complete search history.

(56) References Cited

U.S. PATENT DOCUMENTS

| | | | |
|---|---|---|---|
| 4,285,632 A | | 8/1981 | DeSalve |
| 4,565,505 A | | 1/1986 | Woollenweber |
| 4,652,219 A | | 3/1987 | McEachern, Jr. et al. |
| 4,708,602 A | * | 11/1987 | McEachern, Jr. ..... F01D 25/164 384/474 |
| 4,721,441 A | | 1/1988 | Mayashita et al. |
| 4,789,253 A | * | 12/1988 | Perego ................. F01D 25/164 384/517 |
| 4,808,091 A | * | 2/1989 | Ruetz ..................... F01D 25/16 384/556 |
| 4,943,170 A | | 7/1990 | Aida |
| 4,983,050 A | | 1/1991 | Aida |
| 4,997,290 A | | 3/1991 | Aida |
| 5,246,352 A | | 9/1993 | Kawakami |
| 5,253,985 A | * | 10/1993 | Ruetz ................... F01D 25/164 384/473 |
| 5,522,667 A | | 6/1996 | Miyake |
| 5,622,358 A | | 4/1997 | Komura |
| 5,639,074 A | | 6/1997 | Greenhill et al. |
| 6,971,801 B2 | | 12/2005 | Miyazaki et al. |
| 7,214,037 B2 | | 5/2007 | Mavrosakis |
| 8,985,857 B2 | | 3/2015 | Schmidt et al. |
| 2007/0036477 A1 | | 2/2007 | McKeirnan, Jr. |
| 2007/0154126 A1 | | 7/2007 | Ito |
| 2007/0183704 A1 | | 8/2007 | Umekawa |
| 2007/0280824 A1 | | 12/2007 | Ward |
| 2008/0019629 A1 | | 1/2008 | McKeirnan |
| 2009/0202343 A1 | | 8/2009 | McKeirnan |
| 2011/0200422 A1 | | 8/2011 | Gutknecht |
| 2011/0274379 A1 | | 11/2011 | Fiedler et al. |
| 2012/0282078 A1 | | 11/2012 | Marsal et al. |
| 2013/0294948 A1 | | 11/2013 | Schumnig |
| 2014/0119898 A1 | | 5/2014 | Nishida |
| 2014/0358363 A1 | * | 12/2014 | Mavrosakis .......... F16O 33/585 701/32.7 |
| 2014/0369865 A1 | | 12/2014 | Marsal |

FOREIGN PATENT DOCUMENTS

| | | |
|---|---|---|
| JP | H06-001737 U | 1/1994 |
| JP | 2002129967 A | 5/2002 |
| JP | 2002129968 A | 5/2002 |
| JP | 2002129969 A | 5/2002 |
| JP | 2002242937 A | 8/2002 |
| JP | 2005171796 A | 6/2005 |
| JP | 2005172099 A | 6/2005 |
| JP | 2006090402 A | 4/2006 |
| JP | 2009204004 | 9/2009 |
| JP | 2009-293614 A | 12/2009 |
| JP | 2010151293 A | 7/2010 |
| WO | 20020006649 A1 | 1/2002 |
| WO | 2005057032 A1 | 6/2005 |
| WO | 2005073575 A1 | 8/2005 |
| WO | 2012 079880 A1 | 6/2012 |
| WO | 2014014791 A1 | 1/2014 |

OTHER PUBLICATIONS

PCT/US2016/026880 International Search Report, dated Jul. 19, 2016 (4 pages).
PCT/US2016/026880 Written Opinion, dated Jul. 19, 2016 (9 pages).
PCT/US2016/026872 International Search Report, dated Jul. 22, 2016 (4 pages).
PCT/US2016/026872 Written Opinion, dated Jul. 19, 2016 (10 pages).
EP Application No. 16 163 758.2, Examination Report & Search Report, dated Aug. 23, 2016 (6 pages).
Extended European search report, Appl. No. 16780508.4-1007 / 3283743 PCT/US2016026880, dated Nov. 7, 2018 (8 pages): D1 (U.S. Pat. No. 5,253,985A), D2 (U.S. Pat. No. 4,789,253A), D3 (U.S. Pat. No. 4,808,091A) and D6 (U.S. Pat. No. 7,214,037B2/ US2005/287018A1) already cited U.S. Appl. No. 15/095,089.

* cited by examiner

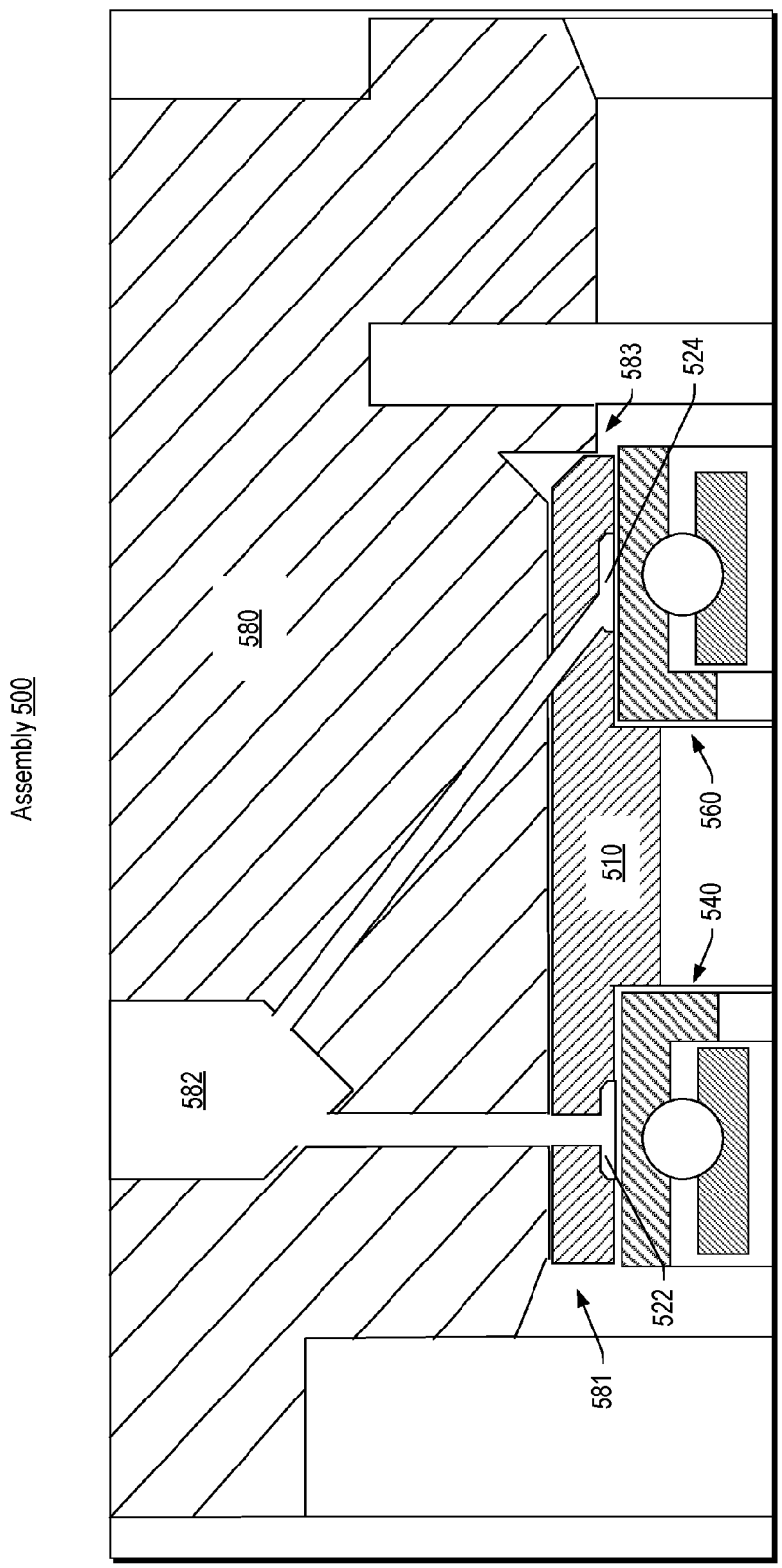

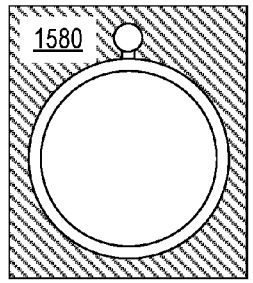
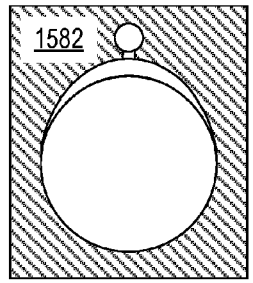
Fig. 15A    Fig. 15B
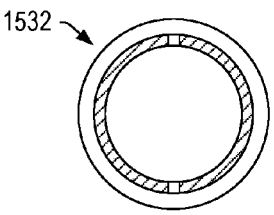
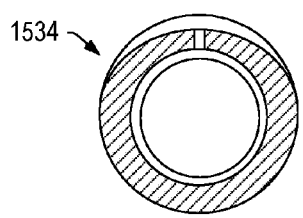
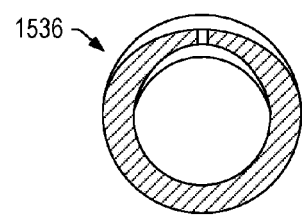
Fig. 15C    Fig. 15D    Fig. 15E
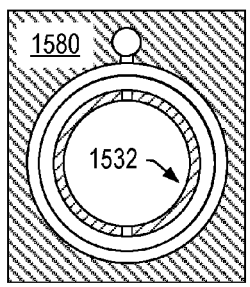
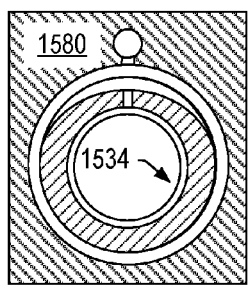
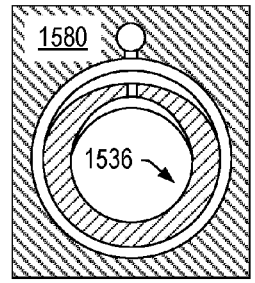
Fig. 15F    Fig. 15G    Fig. 15H
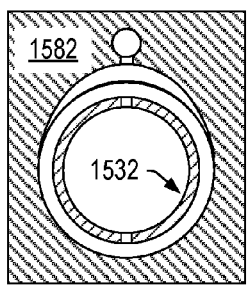
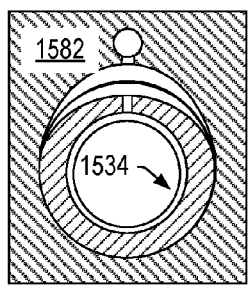
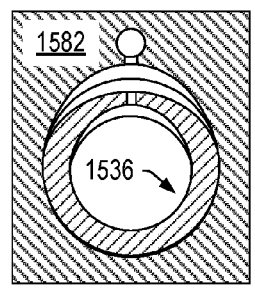
Fig. 15I    Fig. 15J    Fig. 15K

TURBOCHARGER BEARING ASSEMBLY

RELATED APPLICATIONS

This application claims priority to and the benefit of a U.S. Provisional Application having Ser. No. 62/146,344, filed 12 Apr. 2015, which is incorporated by reference herein.

TECHNICAL FIELD

Subject matter disclosed herein relates generally to turbochargers.

BACKGROUND

A turbocharger can increase output of an internal combustion engine. A turbocharger can include an exhaust turbine assembly that can receive exhaust gas from cylinders of an internal combustion engine. Exhaust may be directed to a turbine wheel such that energy may be extracted, for example, to drive a compressor wheel of a compressor assembly.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIG. 5 shows an example of an assembly;
FIGS. 15A to 15K show various cross-sectional views of housings and sleeves and housing and sleeve assemblies.

DETAILED DESCRIPTION

Figure 1:
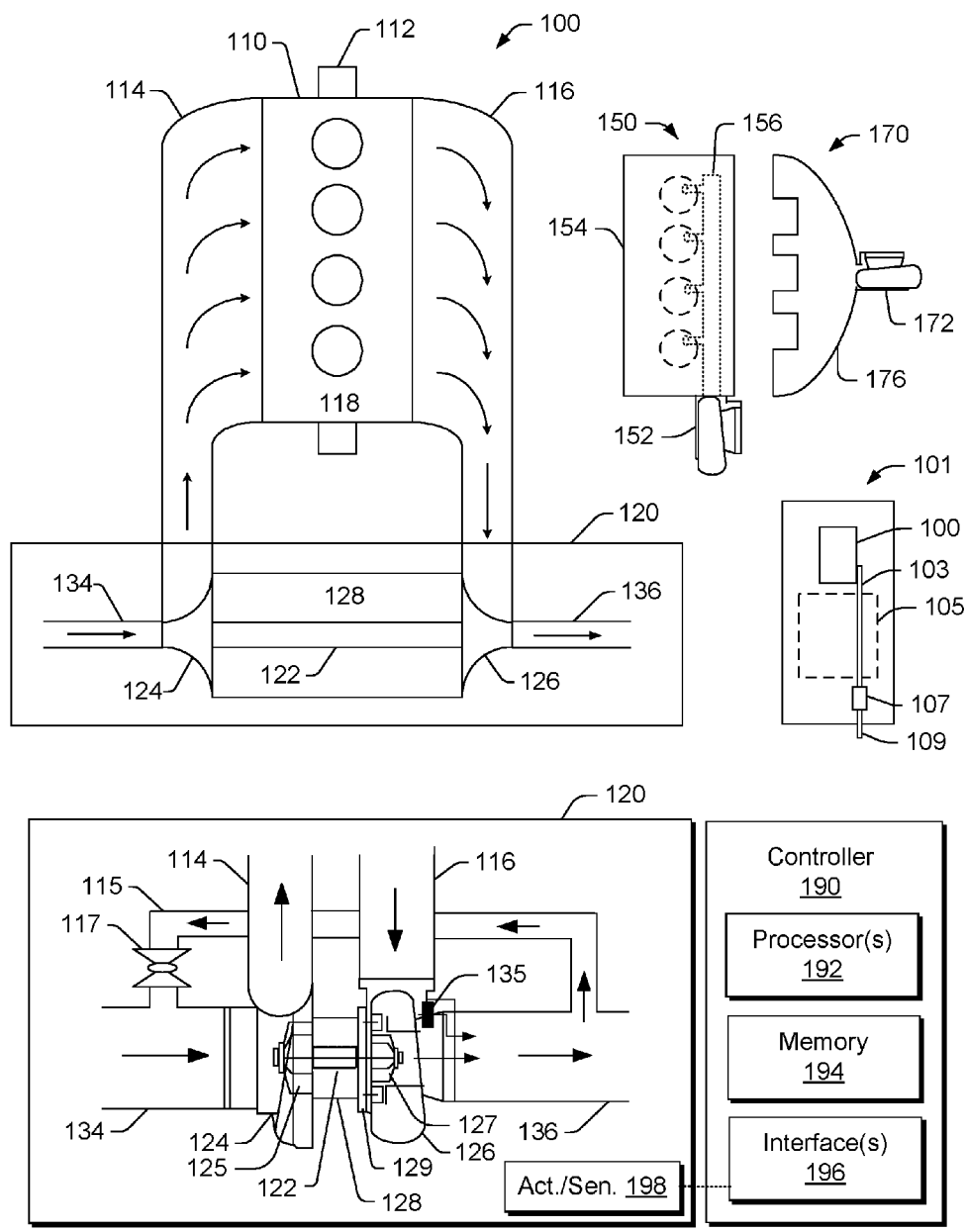
FIG. 1 is a diagram of an example of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Exhaust driven turbochargers can include a rotating shaft carrying a turbine wheel and a compressor wheel where the shaft is typically rotatably supported within a center housing (e.g., intermediate a compressor and a turbine) by one or more lubricated bearings (e.g., oil lubricated). During operation, exhaust from an internal combustion engine drives a turbocharger's turbine wheel, which, in turn, drives the compressor wheel to boost charge air to the internal combustion engine.

During operation, a turbocharger's rotating assembly may reach rotational speeds in excess of 100,000 rpm (e.g., some may reach rotational speeds of 250,000 rpm or more). To handle such high speeds, a turbocharger's center housing rotating assembly (CHRA) requires balance and adequate lubrication. Factors such as noise, vibration and harshness (NVH), as well as efficiency, are often interrelated and must be within acceptable limits. As an example of interrelatedness, vibration can generate noise and reduce efficiency. Further, under dynamic conditions, such as an increase in exhaust flow, axial thrust forces can cause contact between various CHRA components. Contact can cause wear, which, in turn, can alter balance, leading to increased noise, vibration, etc., and reduced efficiency. Certain types of contact and wear may lead to failure of one or more components.

Turbocharger bearing systems may offer both support and damping to control motion of a turbocharger shaft, for example, to help isolate vibrations from rotating parts while allowing the turbocharger shaft to spin, for example, at speeds that may be about 60 times faster than a maximum engine speed (e.g., consider a diesel engine). A turbocharger bearing system may help ensure turbocharger operational efficiency by keeping frictional losses and NVH low such that energy from the engine exhaust gas is available to drive the turbocharger. Where operational conditions may vary, a turbocharger bearing system may be selected to help balance low-power losses with an ability to control forces applied by varying mechanical loading (e.g., thrust and other forces).

As to turbocharger bearing system hydrodynamics, fluid (e.g., oil or other lubricant) may lubricate components and also influence motion of a turbocharger shaft. As an example, a "fully-floating" bearing system can include a journal bearing that supports a shaft using an outer film disposed between a bore wall of a center housing and an outer surface of the journal bearing and an inner film disposed between an inner surface of the journal bearing and an outer surface of the shaft. In such an example, the journal bearing may rotate (azimuthally) at approximately one-half the speed of the shaft and move axially and radially (i.e., the journal bearing is fully-floating).

As to a "semi-floating" approach, an anti-rotation mechanism may act limit rotation (azimuthally) of a journal bearing or, for example, an outer race of a rolling element bearing (REB). As an example, a semi-floating journal bearing or a semi-floating REB may support a shaft using, in part, an outer oil film disposed between an outer surface of the journal bearing or an outer surface of the REB and a bore wall of a center housing where the outer oil film acts as a "squeeze film", for example, to damp undesirably shaft motions.

As an example, a turbocharger may include one or more rolling element bearings (REBs), which may be, for example, one or more ball bearing assemblies. As an example, a turbocharger may include one or more journal bearings (e.g., with an inner journal surface and an outer surface). As an example, a turbocharger may include at least one REB and at least one journal bearing.

As an example, an REB can include an outer race, an inner race and rolling elements disposed between the inner and outer races (e.g., in a raceway or raceways). For example, consider an REB that includes a unitary outer race and a two-piece inner race fit to a turbocharger shaft (e.g., a shaft and wheel assembly (SWA) where rolling elements allow for rotation of the shaft and two-piece inner race with respect to the outer race). In such an example, the outer race of the REB may be "located" in a bore of a housing such as a center housing (e.g., disposed between a compressor housing and a turbine housing).

As an example, to axially locate an outer race with respect to a center housing, a turbocharger assembly may include locating mechanism. As an example, a locating mechanism may include one or more key-keyway pairs where a key received by a keyway acts to restrict, for example, azimuthal rotation of an outer race about an axis. Such an anti-rotation mechanism may provide for a "semi-floating" arrangement, for example, where an outer race has an ability to move in a radial direction and where radial clearances between an outer surface of the outer race and a bore surface of a center housing or a sleeve provide for squeeze film formation (e.g., one or more lubricant films).

As an example, a turbocharger bearing assembly can include a spacer configured to space two turbocharger bearings. As an example, a spacer may be part of a sleeve, for example, a sleeve with a spacer portion along its axial length. As an example, a spacer or spacer portion of a sleeve may be configured as an annular body that defines a central through bore and that includes an axial end face and an opposing axial end face. In such an example, the spacer or spacer portion of a sleeve may include a diameter (e.g., or radii) that may optionally provide for an interference fit with respect to a wall or walls of a bore of a housing. For example, a spacer or a sleeve with a spacer portion may be interference-fit into a bore of a housing to be retained in the bore of the housing with a static force sufficient to axially locate one or more bearing assemblies. As an example, a sleeve may include a flange that includes features that allow the sleeve to be operatively coupled and located with respect to a center housing. In such examples, the spacer or the spacer portion of the sleeve may space and, at least in part, axially locate a compressor side bearing and a turbine side bearing, which may be, for example, rolling element bearings (REBs) (e.g., ball bearing assemblies) or, for example, a compressor side REB and a turbine side journal bearing.

As an example, a through bore of a housing may include a counterbore that includes an axially facing surface. For example, a through bore may include a sleeve portion that can receive at least a portion of a sleeve where a counterbore may act to axially locate an end of the sleeve. As an example, a counterbore may be formed by machining a housing with a through bore from a compressor side to create an enlarged bore that can receive at least a portion of a sleeve. In such an example, the sleeve may include a spacer portion that can act to axially locate a compressor side bearing and to axially locate a turbine side bearing.

As an example, a spacer portion of a sleeve may include a spring or springs, for example, where such a spring or springs may act to damp axial thrust forces, enhance balanceability (e.g., of a CHRA), etc. As an example, a spring may be provided as a biasing unit or biasing mechanism, for example, with an end cap at each end of the spring. Such a unit or mechanism may be configured to simultaneously contact, via its end caps, a compressor side bearing and a turbine side bearing. For example, such a unit or mechanism may contact, via a first end cap, an outer race of a compressor side REB and may contact, via a second end cap, an outer race of a turbine side REB.

As an example, a method can include interference-fitting a sleeve into a bore of a housing (e.g., by contacting a housing mating surface and a sleeve mating surface). As an example, in an assembly, a housing may be a turbocharger center housing, a shaft may be a shaft and wheel assembly (SWA), a first rolling element bearing may be a turbine side REB and a second rolling element bearing may be a compressor side REB. As an example, a method may include operating a turbocharger while axially locating, via a spacer portion of a sleeve, a turbine side REB and a compressor side REB where the spacer portion of the sleeve is disposed axially between the two REBs by having been fit into a bore of a housing of the turbocharger. In such an example, the spacer portion of the sleeve may provide for contacting an outer race of the turbine side REB and for contacting an outer race of the compressor side REB.

As an example, a spring may be disposed in a central through bore of a spacer portion of a sleeve and located via end caps in which the spring is seated. For example, a wave spring may have an uncompressed length that exceeds a length of a spacer portion of a sleeve such that the wave spring can load one or more bearings disposed adjacent to the spacer portion of the sleeve (e.g., via contact formed by end caps in which the wave spring is seated). As an example, squeeze films of an outer race of a turbine side REB and an outer race of a compressor side REB (e.g., with respect to respective clearances with a sleeve wall) may, in combination with a spring disposed between end caps that are located in a bore of a spacer portion of a sleeve, enhance performance of a turbocharger (e.g., a turbocharger CHRA). As an example, performance may be enhanced by a spring, for example, as to balanceability. As an example, one or more squeeze films may help to enhance performance, for example, by damping vibrations, etc. that may occur during operation of a turbocharger. As an example, an outer race of one or more bearings may be fully-floating or semi-floating.

As an example, an end cap may include one or more lubricant wells located at an axial end face. For example, a first end cap may include an annular compressor end well and a second end cap may include an annular turbine end well. Such features may act as thrust pads with respect to outer races. As an example, formation of one or more lubricant films may occur between an end cap and a bearing. With increased damping provided by lubricant films and spring loading, certain vibrations may be diminished in dynamic imbalance measurements, which may allow for improved assembly balancing (e.g., to reduce NVH). As an example, lubricant between an end cap and an outer race may reduce friction and, for example, act to decrease wear between parts.

Figure 2:
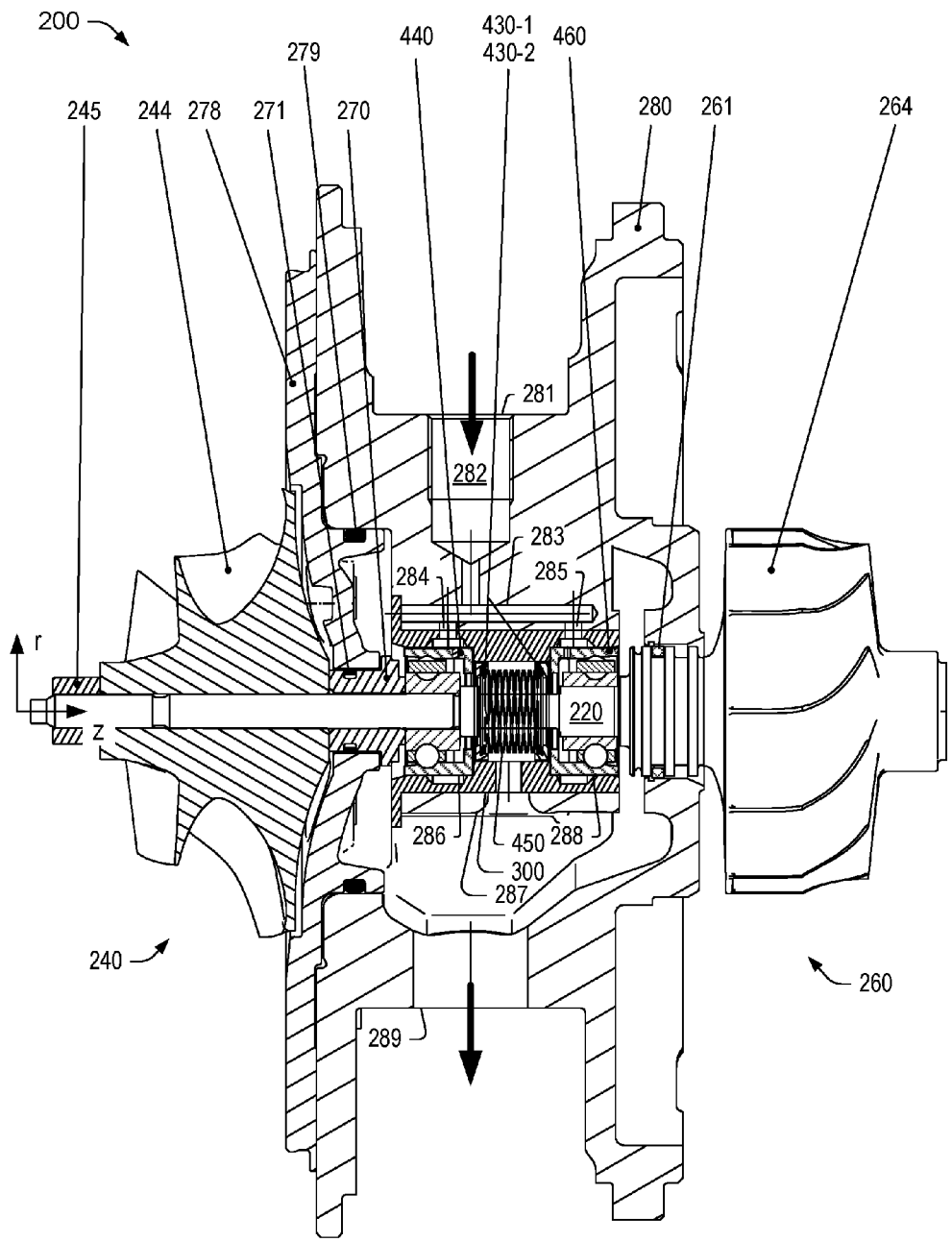
FIG. 2 shows a cutaway view of an example of a turbocharger assembly.

FIG. 2 shows an example of a turbocharger assembly 200. As shown, the turbocharger assembly 200 can include a rotatable shaft 220 supported by a compressor side bearing 440 disposed at least in part in a sleeve 300 that is disposed at least in part in a housing 280 and a turbine side bearing 460 disposed at least in part in the sleeve 300 where the bearings 440 and 460 are axially located between a compressor end 240 and a turbine end 260 of the turbocharger assembly 200. As shown, a compressor wheel 244 may be fit to the shaft 220 and secured via a nut 245 while a turbine wheel 264 may be an integral portion of the shaft 220, for example, via welding (e.g., to form a shaft and turbine wheel assembly or "SWA"). As an example, one or more seal rings 261 may be disposed in grooves of a portion of the shaft 220, for example, to form a seal with a bore of the housing 280 (e.g., a seal to hinder outward flow of lubricant and inward flow of exhaust). In the example of FIG. 2, the assembly 200 also includes a collar 270 disposed in a bore of a compressor plate 278 and about a portion of the shaft 220. As an example, the collar 270 may include a seal ring 271 (e.g., or more than one seal ring, etc.) and the compressor plate 278 may include a seal ring 279 that may form a seal with the housing 280. Such features may hinder flow of lubricant and air between a compressor space and a housing space.

In the example of FIG. 2, the housing 280 includes a lubricant inlet 281 and a lubricant outlet 289. As indicated by arrows, lubricant may flow from the inlet 281 to the outlet 289 via a bore 282 (e.g., of a lubricant inlet port) that directs lubricant to various lubricant passages with openings along a first axial bore portion 286 of the housing 280 (e.g., a sleeve bore compressor side bearing portion) and a second axial bore portion 288 of the housing 280 (e.g., a sleeve bore turbine side bearing portion). For example, the housing 280 includes an axially extending lubricant passage 283 that is in fluid communication with a radially extending compressor side bearing lubricant passage 284 and a radially extending turbine side bearing lubricant passage 285. The lubricant outlet 289 can collect lubricant that flows through or around the components in various bore portions of the housing 280.

As an example, a clearance between components may form a passage for flow of lubricant. In such an example, a clearance may be defined with respect to a cylindrical coordinate system (e.g., r, z, and $\Theta$). As an example, a clearance may extend azimuthally about another component, for example, 360 degrees (e.g., consider a full annular passage) or, for example, less than 360 degrees (e.g., consider a passage that is a part of an annulus).

As an example, lubricant may flow via the lubricant output 289 to then be cooled, filtered, etc., and, for example, eventually recirculated to the inlet 281 (e.g., via a lubricant pump of an internal combustion engine). To assist with flow of lubricant, the inlet 281 and the outlet 289 may be aligned with gravity.

As an example, in a non-operational state, a rotating assembly may rest in the bore portions 286 and 288 at least in part along a lower bore wall surface (e.g., due to gravity). Upon commencement of an operational state, the rotating assembly may lift off one or more surfaces, for example, at least in part due to lubricant flow, lubricant film formation, etc. For example, where substantially annular clearances exist between components that allow one or more components to float where such clearances can be filled at least in part with lubricant under pressure (e.g., from a pump, etc.), where the lubricant drains or lessens in pressure, the components can settle such that the clearances may become, for example, eccentric. In such an example, the components may come to rest in contact with another component or components.

As shown in the example of FIG. 2, the turbocharger assembly 200 includes the sleeve 300, a compressor side REB 440, a spring 450 and a turbine side REB 460. As mentioned, during operation, thrust forces may be generated and transmitted along an axial direction, as represented by a z-axis. Such forces may be directed toward the compressor end or toward the turbine end of the turbocharger assembly 200. As an example, the spring 450 may apply preload to the REBs 440 and 460, which may optionally assist with damping axial vibration.

As an example, a spring may create a substantially constant force on a compressor side bearing to help stabilize a CHRA. As an example, a spring may be a biasing mechanism; accordingly, an assembly may include a sleeve with a spacer portion and a biasing mechanism. As an example, a spring may be part of a subassembly that may form in part, for example, a spring and sleeve assembly (e.g., as a subassembly of a turbocharger assembly).

As an example, a sleeve may be interference fit (e.g., press fit, etc.), for example, with respect to one or more surfaces of a through bore of a housing. As an example, a sleeve may be maintained in a position via an interference fit. As an example, a sleeve may be maintained in a position via one or more of an interference fit and a mechanism that includes, for example, a pin, a bolt, etc. As an example, a sleeve may be maintained in a position (e.g., or at least in part restricted in movement) via a mechanism that includes, for example, a pin, a bolt, etc. As an example, a sleeve may be positioned and radially located via one or more surfaces in a through bore of a housing. As an example, a through bore of a housing can include a counterbore, which may, for example, act, at least in part, to axially locate a sleeve.

Figure 3A:
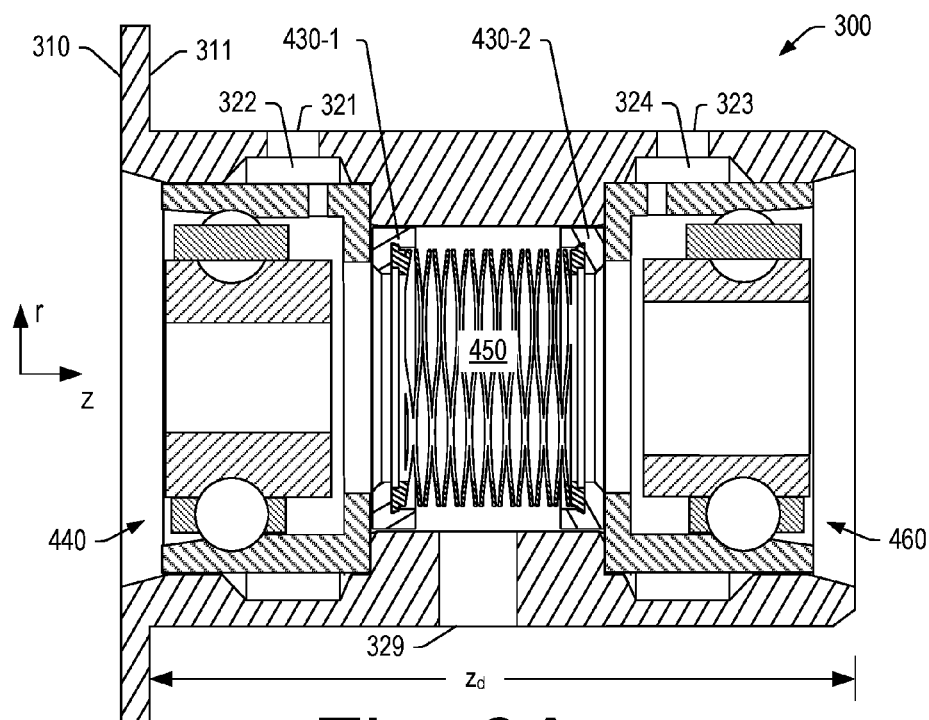
FIGS. 3A and 3B show an example of a bearing assembly that includes a sleeve as in the turbocharger assembly of FIG. 2 and another example of a sleeve, respectively.
Figure 3B:
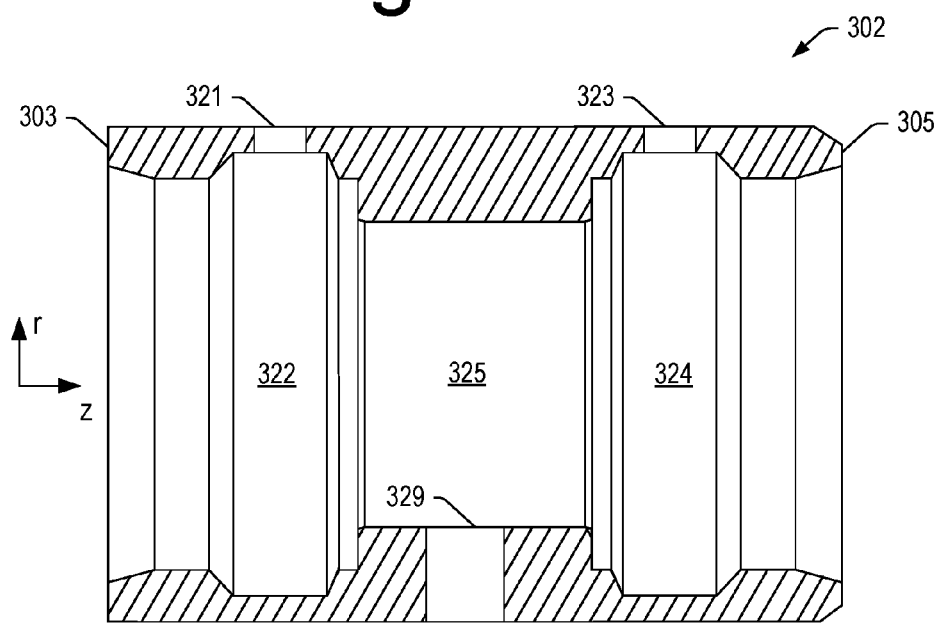

FIGS. 3A and 3B show an example of a bearing assembly that includes a sleeve 300 as in the turbocharger assembly of FIG. 2 and another example of a sleeve 302, respectively. As shown, the sleeve 300 includes a flange portion 310 at a compressor end of the sleeve 300. The flange portion 310, as illustrated in FIG. 2, can include a mating surface 311, for example, to mate against a surface of the housing 280 (e.g., a surface recessed from a compressor end of the housing 280). As an example, the flange portion 310 may form a seal for the passage 283 of the housing 280 (e.g., optionally via a seal element or seal elements (e.g., O-ring or O-rings, etc.) that may be in contact with the flange portion 310). As an example, a flange portion of a sleeve may contact another component (e.g., a face of a housing, etc.) to axially locate a sleeve in a bore of a housing. For example, the flange portion 310 may determine an axial depth to which the sleeve 300 extends into a bore of a housing. As shown in FIG. 3A, an axial dimension $z_d$ can be an axial depth dimension of the sleeve 300 as extending into a through bore of a housing, which can be defined by the mating surface 311 of the flange 310.

In the examples of FIGS. 3A and 3B, the sleeves 300 and 302 include lubricant openings 321 and 323 that are in fluid communication with annular recesses 322 and 324, respectively, where a spring space bore 325 is disposed axially between the annular recesses 322 and 324 and where a lubricant opening 329 is in fluid communication with the spring space bore 325.

As shown in FIG. 3A, the annular recess 322 can be, for example, 360 degrees and surround the bearing 440 and the annular recess 324 can be, for example, 360 degrees and surround the bearing 460. As shown, a bearing can include one or more openings such that lubricant can flow from an annular recess to an interior space of the bearing. For example, the bearing 440 includes an outer race with at least one lubricant opening that allows for flow of lubricant to rolling elements disposed between the outer race and, for example, an inner race (e.g., or a shaft where the rolling elements contact the shaft); and the bearing 460 includes an outer race with at least one lubricant opening that allows for flow of lubricant to rolling elements disposed between the outer race and, for example, an inner race (e.g., or a shaft where the rolling elements contact the shaft). An annular recess such as the annular recess 322 or 324 can form a thick film over at least a portion of an outer surface of a bearing and, for example, other portions of the sleeves 300 and 302 can form one or more thinner films over at least a portion of an outer surface of a bearing. In such an example, the one or more thinner films may be considered to be damper films having particular characteristics that differ from those of the thicker film as associated with an annular recess.

In the example of FIG. 3A, the spring 450 is illustrated in a "loaded" state with respect to the bearings 440 and 460; noting that such a state is achieved when the sleeve 300 and the bearings 440 and 460 are coupled to a shaft (see, e.g., FIG. 2). In other words, force applied by the spring 450 would push one or both of the bearings axially outwardly as radial clearances exist between the respective outer races of the bearings 440 and 460 and inner bore surfaces of the sleeve 300.

In the example of FIG. 3B, the sleeve 302 does not include a flange portion such as the flange portion 310 of the sleeve 300. As shown, the sleeve 302 extends from a compressor side end 303 to a turbine side end 305, which can define an axial length of the sleeve 302. As an example, a bore of a housing may include a counterbore and/or one or more other features that can act to axially locate a sleeve such as the sleeve 302. For example, the sleeve 302 may be located axially in a bore of a housing via a counterbore of the housing where a surface of the counterbore contacts a surface or surfaces at the turbine side end 305 of the sleeve 302.

As an example, a sleeve can include one or more recessed surfaces that can contact a counterbore segment or segments (e.g., or vice versa). In such an example, the one or more recessed surfaces and the segment or segments can act as key and keyway, which may provide for locating the sleeve 302 in a through bore of a housing (e.g., axial locating, radial location and azimuthal locating). In such an example, the sleeve may be limited in its rotation and axially located via contact between the sleeve and the one or more counterbore segments.

As an example, a counterbore of a housing can be of an azimuthal span of 360 degrees or less. As an example, a counterbore may be formed by one or more segments. For example, consider two segments that span about 30 degrees that include axial faces and that are defined in part by radii that are less than an outer radius of the sleeve 302. In such an example, the axial faces can be contacted by the sleeve (e.g., by a surface or surfaces of the turbine end 305, by a recessed surface or surfaces inset from the turbine end 305, etc.).

Figures 4A, 4B, 4C:
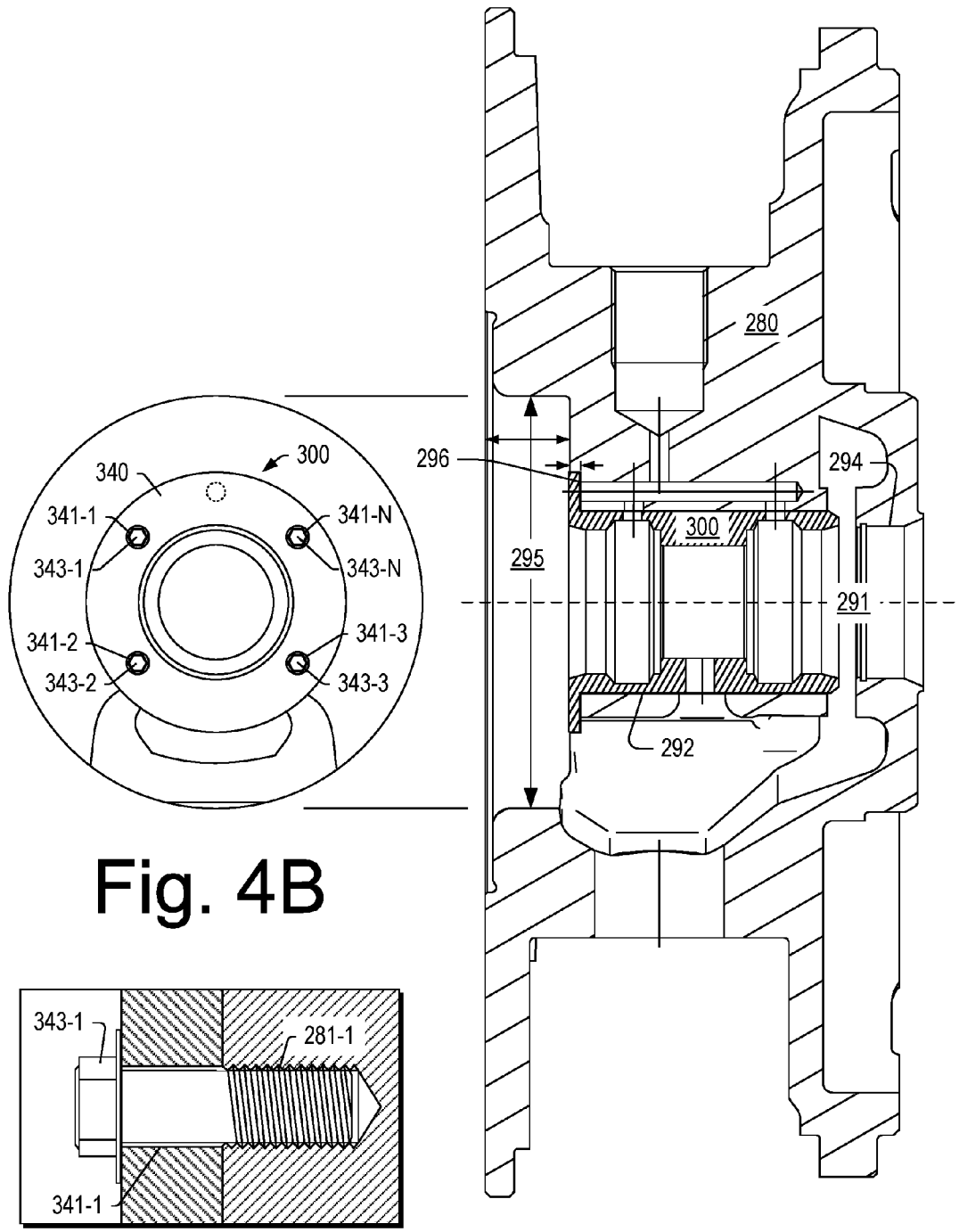
FIGS. 4A, 4B and 4C show views of the sleeve of FIG. 3A as received by an example of a turbocharger center housing.

FIGS. 4A, 4B and 4C show views of the sleeve 300 of FIG. 3A as received by an example of a turbocharger center housing 280. As shown, the housing 280 includes a through bore 291 that includes a sleeve bore portion 292 with an axial length that is less than the axial length of the sleeve 300. For example, the sleeve 300 can extend past an axial end of the sleeve bore portion 292 of the through bore 291 of the center housing 280 such that a turbine end of the sleeve 300 defines a clearance with respect to another portion 294 of the through bore 291. As shown in FIG. 2, the portion 294 can receive a portion of a shaft and wheel assembly (SWA) where one or more seal elements (e.g., O-rings, piston rings, etc.) may be disposed between the portion 294 and the portion of the SWA. Such an arrangement can hinder flow of lubricant outwardly and/or hinder flow of exhaust inwardly.

As shown, the housing 280 can include a compressor side recess 295, which may include another recess 296 that can seat the flange 310 of the sleeve 300. As shown the recess 295 may be defined in part by a radius and an axial dimension and the recess 296 may be defined in part by a radius and an axial dimension. As shown the radius of the recess 296 is less than the radius of the recess 295. As an example, dimensions of the recess 296 may allow for at least a portion of the flange 310 of the sleeve 300 to be flush (e.g., substantially even) with an axial face of the recess 296. As mentioned, contact between the surface 311 of the flange 310 of the sleeve 300 and a surface of a housing can define an axial depth of a portion of the sleeve 300 that extends into a through bore of a housing. Again, as shown, the axial depth of the sleeve 300 extends axially past an end of the portion 292 of the through bore 291, yet does not extend axially to a portion 291 of the through bore 291.

As an example, the flange 310 may include one or more openings 341-1, 341-2, 341-3 to 341-N that may receive one or more respective bolts 343-1, 343-2, 343-3 to 343-N, for example, via one or more respective openings 281-1 in the housing 280. For example, FIG. 4C shows the bolt 343-1 as passing in part through the opening 341-1 and being threaded into threads of the opening 281-1 of the housing 280.

As an example, a sleeve may be operatively coupled to a housing (e.g., directly and/or indirectly) via one or more mechanisms. For example, consider a sleeve that is interference fit to a housing, a sleeve that is bolted to a housing or a sleeve that is interference fit to a housing and bolted to the housing. As an example, a sleeve may be maintained in a position and/or limited in motion via one or more pins and/or one or more retaining rings. As a sleeve can include a spacer portion, which may receive axial thrust forces, a coupling mechanism or mechanisms may be selected to assure that the sleeve does not translate axially responsive to such axial thrust forces. As an example, a sleeve may be azimuthally located with respect to a housing such that the sleeve does not rotate or is limited to an amount of rotation. As an example, a sleeve may be cooled to a temperature less than a temperature of a housing and then inserted at least in part into the housing. In such an example, as the temperatures equalize, the sleeve may expand to form an interference fit to the housing. In such an example, a bolt, bolts, etc. may be used to secure the sleeve to the housing. For example, a bolt may contact, directly and/or indirectly, a flange portion of a sleeve and contact a housing to secure the sleeve to the housing.

As an example, an assembly can include a turbocharger center housing (see, e.g., the housing 280) that includes a through bore and a counterbore positioned between a compressor end and a turbine end of the through bore where the counterbore includes a sleeve mating surface.

FIG. 5 shows an example of an assembly 500 that includes a sleeve 510, bearings 540 and 560 and a housing 580 that includes a bore 581, lubricant passages 582 and a counterbore 583. As an example, consider the assembly 500 where the sleeve 510 is press-fit in the housing 580 (e.g., axial length within the bore 581); where an axial stop is made by the counterbore 583 to locate axially the sleeve 510; where radial grooves 522 and 524 of the sleeve 510 (e.g., 360 degree radial grooves) provide for distribution of lubricant fed via the lubricant passages 582; and where squeeze films can be formed between surfaces of the sleeve 510 and outer races of the bearing 540 and 560. Such films can provide characteristics for damping of vibration, reduction of noise, etc.

As an example, a method can include machining one or more lubricant passages after interference fitting the sleeve 510 into the bore 581 of the housing 580. For example, a sleeve may be provided with the radial grooves such as the radial grooves 522 and 524 and a may be provided housing with a lubricant inlet bore. In such an example, after positioning of the sleeve, a drill may be used to drill openings in the sleeve and passages in the housing such that the lubricant inlet bore is in fluid communication with the radial grooves 522 and 524. As an example, a drill or drill bit may be positioned via a through bore end, a lubricant drain, etc. of a housing to access radial grooves of a sleeve that is disposed at least in part in the through bore of the housing. As an example, the sleeve may be removed from the through bore of the housing and fit with one or more components and then reinserted into the through bore of the housing.

As an example, a method can include positioning a sleeve in a bore of a housing, inserting a shaft and wheel assembly with a turbine side bearing via a turbine side of the housing, inserting a spring (e.g., a spring assembly) via a compressor side of the housing, and inserting a compressor side bearing via the compressor side of the housing. Such a method may provide for an improved press fit load, reduce squeeze film damage during assembly and/or provide for ease of machinability by machining features of a sleeve rather than a housing.

Figure 6:
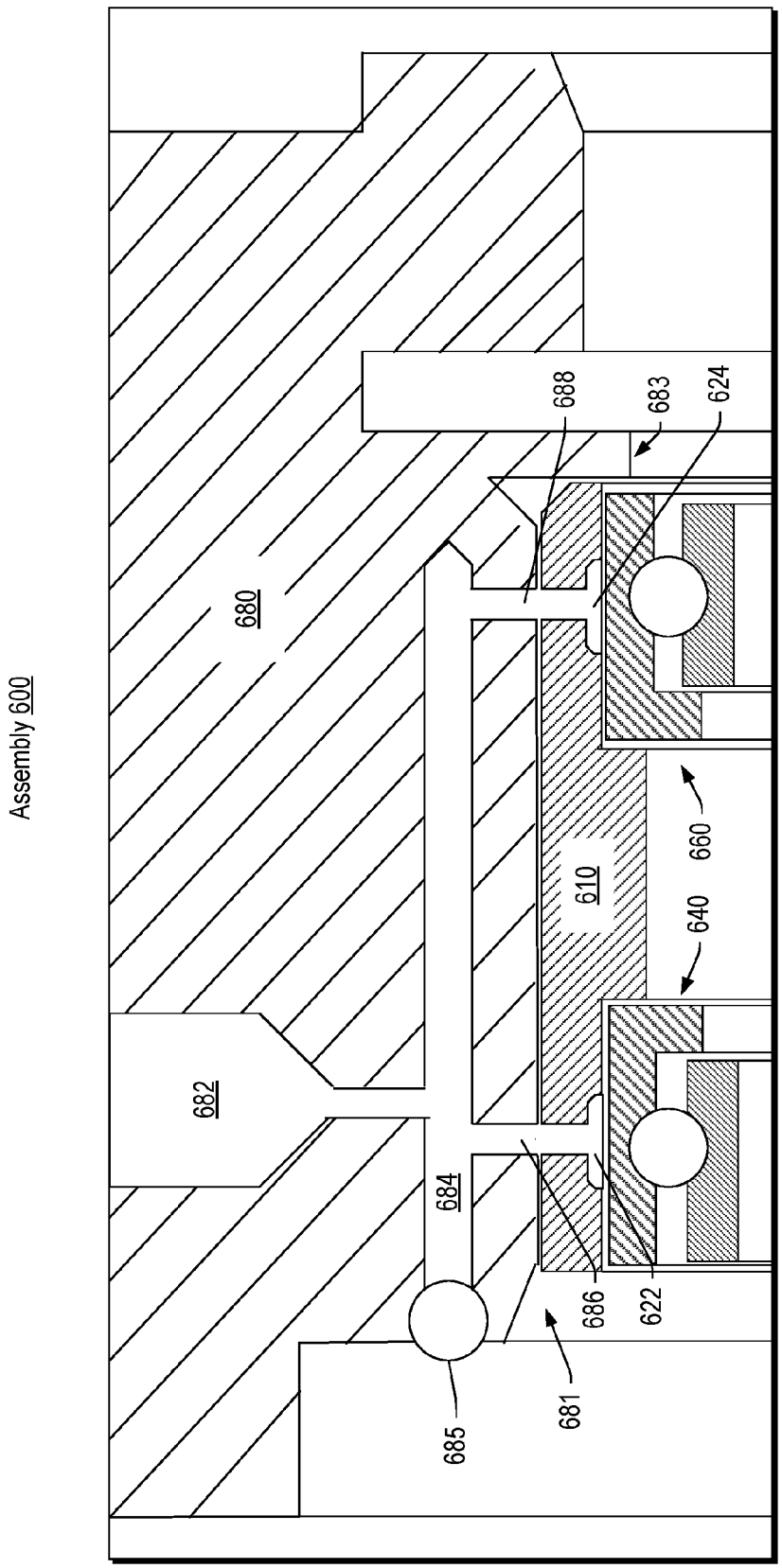
FIG. 6 shows an example of an assembly.

FIG. 6 shows an example of an assembly 600 that includes a sleeve 610, bearings 640 and 660 and a housing 680 that includes a bore 681, a lubricant inlet bore 682, a counterbore 683 and a lubricant passage 684. The lubricant passage 684 of the assembly 600 includes a portion that extends from a surface of the housing 680 at least in part axially toward the turbine side of the housing 680. The lubricant passage 684 may be, for example, machined via the compressor side of the housing 680.

As shown in FIG. 6, the housing 680 includes crescent shaped grooves 686 and 688 (shown in cross-section) and the sleeve 610 includes radial grooves (e.g., annular recesses) 622 and 624. One or more openings in the sleeve 610 can allow for fluid communication between the crescent shaped groove 686 and the radial groove 622 and the crescent shaped groove 688 and the radial groove 624. In such an example, an interference fit between an outer surface of the sleeve 610 and an inner surface of the through bore of the housing 680 can assure contact therebetween which may act to seal about junctures of the grooves 686 and 688 and the sleeve 610 such that lubricant flows predominantly radially to the grooves 622 and 624 of the sleeve 610.

As an example, consider the assembly 600 where the sleeve 610 is interference fit in the housing 680; where an axial stop is formed by the counterbore 683 to axially position of the sleeve 610; where the axial stop is formed in a manner that acts to reduce lubricant leakage on turbine side, for example, consider the counterbore 683 extending radially inwardly to below a radial dimension of the outer race of the bearing 660, which may be less than an outer radius of an inner race of the bearing 660; where the radial grooves 622 and 624 are formed in the sleeve 610; where one or more passages may be drilled in the radial grooves 622 and 624; where one or more of the lubricant passages 682 may be machined into the housing 680, for example, before positioning of the sleeve 610, and where the crescent shaped grooves 686 and 688 (shown in cross-section) may be machined into to the housing 680, for example, to provide for flow of lubricant to the radial grooves 622 and 624 of the sleeve 610; and where a seal element (e.g., a plug such as a ball, a plate, etc.) 685 may be positioned to seal an end of a lubricant passage 684. In such an example, lubricant may flow in to the housing 680 and via the lubricant passage 684 to form various squeeze films (e.g., in clearances between outer races of the bearings 640 and 660 and inner surfaces of the sleeve 610).

As an example, a method of assembly can include providing the sleeve 610 and the turbine side bearing 660 in the housing 680, inserting a shaft and turbine wheel assembly (SWA) via the turbine side of the housing 680 such that the shaft of the SWA is received by the turbine side bearing 660 (e.g., received by contacting the inner race of the turbine side bearing 660), inserting a spring and/or spring assembly from the compressor side of the housing 680, and inserting the compressor side bearing 640 into the sleeve 610 such that the inner race of the compressor side bearing 640 contacts the shaft of the SWA.

As an example, a method of assembly can provide for an improved interference fit (e.g., press fit) load and help to minimize risk of squeeze film surface damage during assembly. Where a sleeve is employed, the sleeve may be machined prior to positioning of the sleeve with respect to a housing (e.g., bearing housing or center housing of a turbocharger). Such an approach may be an alternative to machining features directly into a housing (e.g., which can be of greater volume, mass, etc. than a sleeve). As an example, an approach that employs a sleeve may allow for a reduction in a shaft head size, for example, as various components can be positioned via a compressor side of a housing.

Figure 7:
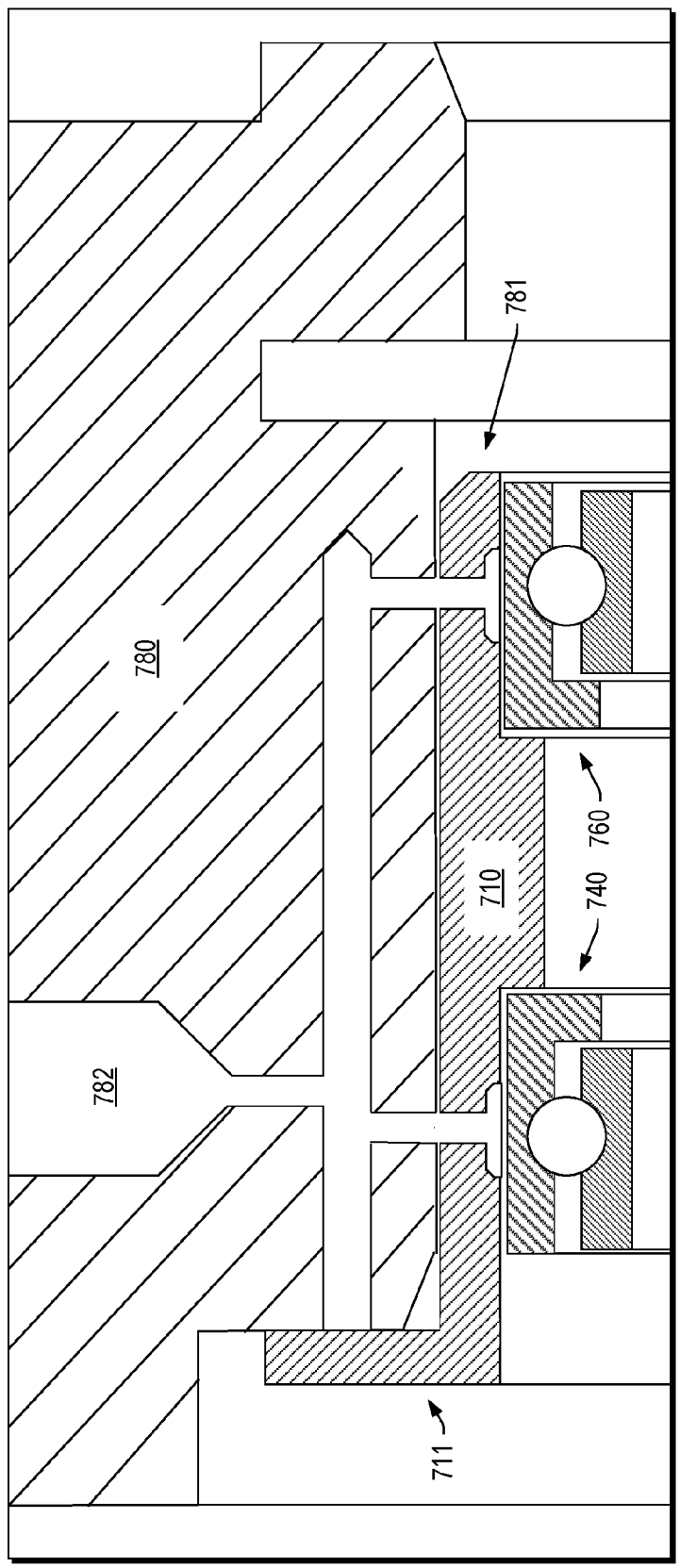
FIG. 7 shows an example of an assembly.

FIG. 7 shows an example of an assembly 700 that includes a sleeve 710 with a flange portion 711, bearings 740 and 760 and a housing 780 that includes a bore 781, lubricant passages 782. The lubricant passages 782 of the assembly 700 include a passage that extends from a surface of the housing 780 axially toward the turbine side of the housing 780, which may be, for example, machined via the compressor side of the housing 780.

As an example, consider the assembly 700 where the sleeve 710 is interference fit with respect to the housing 780. In such an example, the sleeve 710 may be axially located by the flange portion 711 serving as an axial stop with respect to a compressor side surface of the housing 780. For example, a surface of the flange portion 711 may contact a surface of the housing 780 such that the sleeve 710 extends an axial distance into the bore 781 of the housing 780. As an example, lubricant passage features such as radial grooves may be formed directly into the sleeve 710, for example, via machining, etc. In the example of FIG. 7, radial grooves may span 360 degrees about an inner surface (e.g., a sleeve bore surface) of the sleeve 710. As an example, lubricant passages may be formed by drilling into the sleeve 710 such that radial grooves can be in fluid communication with one or more of the passages 782 of the housing 780. For example, one or more holes may be drilled into the sleeve 710 to provide passages between a radial groove and an outer surface of the sleeve 710. As an example, a sleeve may include an exterior radial groove and an interior radial groove where one or more passages connect the exterior and interior radial grooves. As an example, an exterior groove may be 360 degrees or less than 360 degrees.

As an example, the housing 780 may be machined to form passages. For example, one or more features may be machined into the bore 781 of the housing 781. As an example, consider machining in semi-annular crescent shaped features (see also, e.g., the grooves 686 and 688 of FIG. 6) that may span an azimuthal angle (e.g., from about 30 degrees to about 180 degrees or more). In such an example, these features may be in fluid communication with one or more passages in the housing 780 that can deliver lubricant from a lubricant inlet port of the housing 780 to the bore 781 of the housing 780 via these features. As an example, a housing can include a compressor side crescent shaped groove and a turbine side crescent shaped groove where each of these grooves is in communication with a lubricant passage. As illustrated in the example of FIG. 7, passages of the sleeve 710 may align with such crescent shaped passages for supply of lubricant to an interior of the sleeve 710, which, in turn, may be directed to rolling elements via one or more outer race passages, for example, of an outer race of the compressor side bearing 740 and an outer race of the turbine side bearing 760. In such an example, a compressor side clearance between the sleeve 710 and an outer race of the compressor side bearing 740 may fill with lubricant to form a squeeze film and a turbine side clearance between the sleeve 710 and an outer race of the turbine side bearing 760 may fill with lubricant to form a squeeze film.

As an example, an assembly may be assembled by positioning the sleeve 710 in the bore 781 of the housing 780, inserting a shaft and turbine wheel assembly (SWA) and the turbine side bearing 760 via the turbine side of the housing 780 (e.g., where the outer race of the turbine side bearing 760 may be of an outer diameter that is less than an outer diameter of a turbine side opening of the housing 780), inserting a spring (e.g., or spring assembly) via the compressor side of the housing 780 (e.g., about the shaft portion of the SWA), and inserting the compressor side bearing 740 into the housing 780 such that an inner race of the compressor side bearing 740 is in contact with the shaft portion of the SWA. Further assembly can include installation of various compressor side components and other components to form a turbocharger. During operation of such a turbocharger, lubricant can be supplied to form squeeze films about the outer races of the bearings 740 and 760 and lubricant can be supplied to rolling elements of the bearings 740 and 760 via one or more passages (e.g., consider passages in the outer races).

Figure 8:
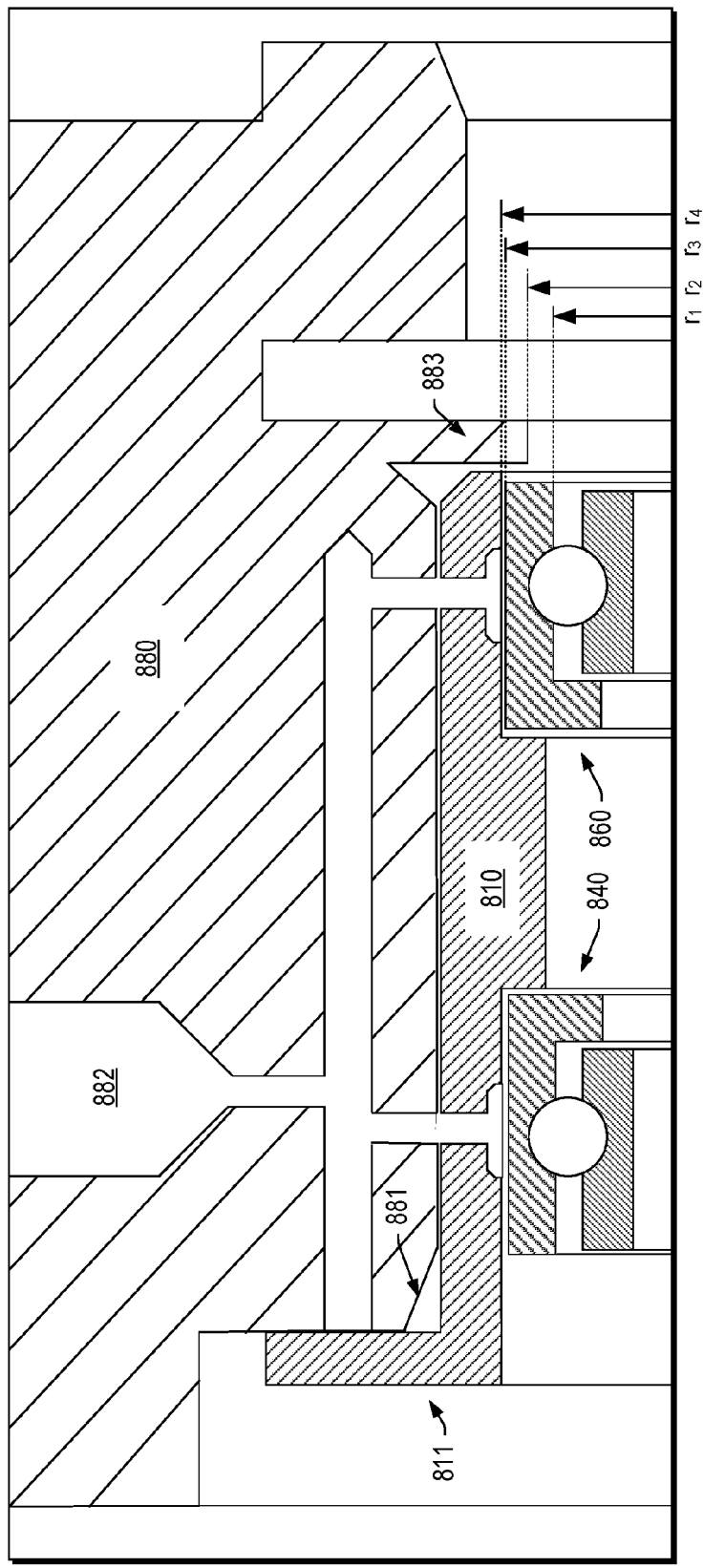
FIG. 8 shows an example of an assembly.

FIG. 8 shows an example of an assembly 800 that includes a sleeve 810 with a flange portion 811, bearings 840 and 860 and a housing 880 that includes a bore 881, a counterbore 883 and lubricant passages 882. The lubricant passages 882 of the assembly 800 include a passage that extends from a surface of the housing 880 axially toward the turbine side of the housing 880, which may be, for example, machined via the compressor side of the housing 880.

As an example, the sleeve 810 may be interference fit into the bore 881 of the housing 880 where, for example, the length of the sleeve 810 in the bore 881 may be determined at least in part via contact between the flange portion 811 and a surface of the housing 880. For example, the flange portion 811 may form an axial stop with respect to one or more other surfaces to define a length of the sleeve 810 that extends into the bore 881 of the housing 880. In such an example, a clearance may exist between a turbine end of the sleeve 810 and the counterbore 883, which may, for example, act to affect flow of lubricant.

As an example, the sleeve 810 can include one or more grooves such as, for example, one or more radial grooves. As an example, a radial groove may be formed along a surface of the sleeve 810 where the radial groove may span an azimuthal angle about a longitudinal axis of the sleeve 810. For example, a groove may span an angle of about 360 degrees such that lubricant may flow in the groove to a surface of an outer race of a bearing that is disposed at least in part in the sleeve 810 (e.g., a bore of the sleeve 810). As an example, one or more holes may be drilled into the sleeve 810 that extend from an outer surface to an inner surface of the sleeve 810. In such an example, the one or more holes may act as lubricant passages such that lubricant can enter the sleeve 810 and generate one or more lubricant films (e.g., squeeze films) and lubricate one or more rolling elements of a rolling element bearing or bearings. As an example, a hole in the sleeve 810 may be in fluid communication with a groove of the sleeve 810.

As shown in the example of FIG. 8, the housing 880 includes various lubricant passages 882. For example, the housing 880 can include a lubricant inlet port that is in fluid communication with lubricant passage network that can distribute lubricant to various portions of the bore 881 of the housing 880. The bore 881 may include features such as one or more crescent shaped grooves (e.g., half-moon grooves) that can be in fluid communication with one or more features of the sleeve 810. For example, a sleeve can include one or more holes that allow for passage of lubricant from an exterior to an interior. In such an example, the holes may be set within a groove or grooves formed in an exterior surface of the sleeve 810 and/or a groove or grooves formed in an interior surface (e.g., bore surface) of the sleeve 810. As an example, the flange portion 811 of the sleeve 810 may directly contact the housing 880 to form a seal that seals a lubricant passage of the housing 880. As an example, a seal element or seal elements (e.g., an O-ring, O-rings, a plug, plugs, etc.) may be covered and optionally in contact with a surface of the flange portion 811 of the sleeve 810 for sealing one or more lubricant passages of the housing 880.

In the example of FIG. 8, the counterbore 883 may span an azimuthal angle about a longitudinal axis of the housing 880. As an example, the counterbore 883 may be formed of one or more portions (e.g., arc-span portions). As an example, an axial clearance can exist between a surface of the counterbore 883 and a turbine end surface of the sleeve 810. In such an arrangement, the counterbore 883 may extend radially inwardly to a radius that is less that an inner radius of the sleeve 810 at the turbine end of the sleeve 810. For example, the counterbore 883 may extend radially inwardly to a radius that is less than an outer radius of an outer race of the turbine side bearing 860 such that a squeeze film formed between the outer race and the sleeve 810 is at least in part at a radius that is greater than a radius of a radially inward facing surface of the counterbore 883. In such an example, lubricant exiting the squeeze film may exit axially and contact the counterbore 883 rather than being ejected axially toward a turbine wheel hub extension seal space formed with respect to a turbine side bore portion of the housing 880. Such an arrangement may diminish the amount of lubricant that can reach the seal space, which may include one or more piston ring types of seal elements seated in one or more grooves of a SWA.

In the example of FIG. 8, various radii are illustrated where $r_1$ corresponds to an inner radius of an outer race of the bearing 860, where $r_2$ corresponds to an inner radius of the counter bore 883, where $r_3$ corresponds to an outer radius of the outer race of the bearing 860, and where $r_4$ corresponds to an inner radius of the sleeve 810. As shown, the radius $r_2$ is less than $r_3$. As shown, the radii are of descending size from $r_4$ to $r_1$.

As an example, a method of assembly may include forming a sub-assembly by positioning the turbine side bearing 860 in the sleeve 810, positioning the sub-assembly in the bore 881 of the housing 880, inserting a shaft and turbine wheel assembly (SWA) from turbine side of the housing 880 and making contact between the shaft of the SWA and an inner race of the turbine side bearing 860 (e.g., via an interference fit), inserting a spring (e.g., or spring assembly) from the compressor side of the housing 880, and inserting the compressor side bearing 840 from the compressor side of the housing 880 and interference fitting an inner race of the compressor side bearing 840 onto the shaft of the SWA. In such an example, various components may be inserted via the compressor side of the housing 880 while the shaft of the SWA is inserted via the turbine side of the housing 880.

Figure 9:
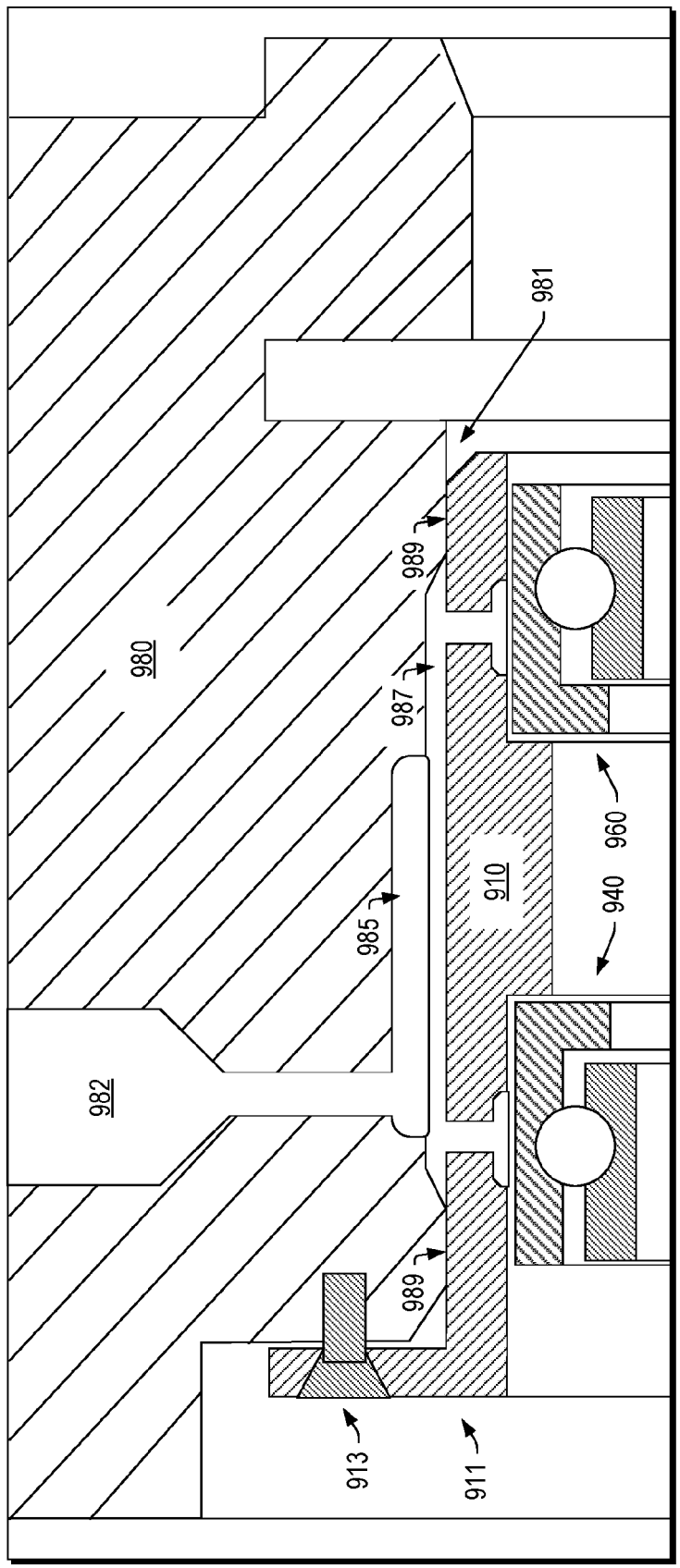
FIG. 9 shows an example of an assembly.

FIG. 9 shows an example of an assembly 900 that includes a sleeve 910 with a flange portion 911, a securing element 913, bearings 940 and 960 and a housing 980 that includes a bore 981 and lubricant passages 982 in fluid communication with lubricant distribution features 985 and 987. The lubricant passages 982 of the assembly 900 include a passage that extends from a surface of the housing 980 radially toward the bore 981 of the housing 980, which may be, for example, machined via a surface of the housing 980 (e.g., optionally forming a lubricant inlet port). As explained with respect to FIG. 2, various housings described herein can also include a lubricant exit or outlet port (see, e.g., port 289 of FIG. 2).

In the example of FIG. 9, the features 985 and 987 may be lubricant gallery features that provide for distribution of lubricant. Such features may be machined into the housing 980, for example, with dimensions that meet one or more performance criteria (e.g., lubricant flow, distribution of lubricant between a compressor bearing portion and a turbine bearing portion of an assembly, residence time, temperature, heat transfer, lubricant velocity, etc.). As shown, the feature 985 can have an axial length that is less than an axial length of the feature 987. As an example, the features 985 and 987 may be defined in part by portions thereof that span one or more azimuthal angles about a longitudinal axis of the housing 980. As an example, the feature 985 may span a less angle than the feature 987. As an example, the feature 987 may be "centered" with respect to the feature 985 in that half of a span extends to one side of the feature 985 and half of a span extends to another side of the feature 987 (e.g., optionally symmetrically in shape).

As an example, the bore 981 of the housing 980 can include "pads" 989 that act to locate the sleeve 910 in the housing 980. For example, the pads 989 can include a compressor side pad or pads and a turbine side pad or pads that are disposed at a radius with an angular span sufficient to radially locate the sleeve 910 in the housing 980.

As an example, the pads 989 may be at a first radius and the sleeve 910 may have an outer surface at a second radius where an interference fit (e.g., a "slight" press fit, etc.) may be achieved by positioning the sleeve 910 in the bore 981 of the housing 980, for example, to radially locate the sleeve 910 in the bore 981 of the housing 980; noting that the sleeve 910 may be secured (e.g., fixed in position) via one or more securing elements. As an example, the pads 989 of the housing 980 may be at different radii and an outer surface of the sleeve 910 can include portions at different radii may be used to achieve an interference fit.

As an example, a pad may be defined in a cylindrical coordinate system, for example, via one or more radii, one or more axial dimensions and one or more azimuthal angles. For example, a pad may be defined by a radius, an axial width and an azimuthal span. As an example, a through bore of a housing can include a plurality of pads where such pads include one or more compressor side pads and/or one or more turbine side pads. As an example, a through bore of a housing can include pad segments where each segment in a pad may be of a similar shape (e.g., dimensions) or of one or more differing shapes. As an example, pads may be shaped and positioned to control flow of lubricant. For example, a pad may contact a sleeve to hinder axial flow of lubricant.

As an example, a method of assembly may include slightly press-fitting the sleeve 910 into the housing 980 on to the pads 989, which may be of an appropriate axial length, radii, etc.; and axially stopping the sleeve 910 by contacting or otherwise fixing the flange portion 911 of the sleeve 910 with respect to a compressor side surface of the housing 980 (see, e.g., the securing element 913, which may be a bolt, a screw, etc.) such that the sleeve 910 extends an axial distance into the bore 981 of the housing 980 (e.g., noting that a plurality of securing elements may be employed).

As an example, the pads 989 of the housing 980 may span about 360 degrees and act to restrict flow of lubricant axially outwardly. For example, a compressor side pad 989 may restrict flow of lubricant axially outwardly from a lubricant gallery toward the compressor side of the housing 980 and, for example, a turbine side pad 989 may restrict flow of lubricant axially outwardly from a lubricant gallery (e.g., a common lubricant gallery) toward the turbine side of the housing 980.

In the example of FIG. 9, radial grooves may be machined or otherwise formed in the sleeve 910 (see, e.g., description of various grooves above such as the grooves 622 and 624 of FIG. 6). In such an example, holes may be drilled that are in fluid communication with the radial grooves. As an example, one or more of the features 985 and 987 may be machined into the housing 980 to form part of a lubricant gallery. For example, the features 985 and 987 may be machined into the housing 980 before the sleeve 910 is inserted into the housing 980. As an example, a lubricant gallery may provide for passage of lubricant to a clearance between an outer surface of an outer race of the compressor side bearing 940 and an inner surface of the sleeve 910 and provide for passage of lubricant to a clearance between an outer surface of an outer race of the turbine side bearing 940 and an inner surface of the sleeve 910. In such an example, holes in the sleeve 910 may be provided such that the clearances and the lubricant gallery are in fluid communication. Lubricant in such clearances may form lubricant films such as squeeze films (e.g., a compressor bearing squeeze film and a turbine bearing squeeze film).

As an example, a method of assembly may include positioning the sleeve 910 in the bore 981 of the housing 980; inserting a SWA and the turbine side bearing 960 as a sub-assembly into the bore 981 of the housing 980 and at least in part into the sleeve 910 via the turbine side of the housing 980; inserting a spring (e.g., or a spring assembly) from a compressor side of the housing 980; and inserting the compressor side bearing 940.

Figure 10:
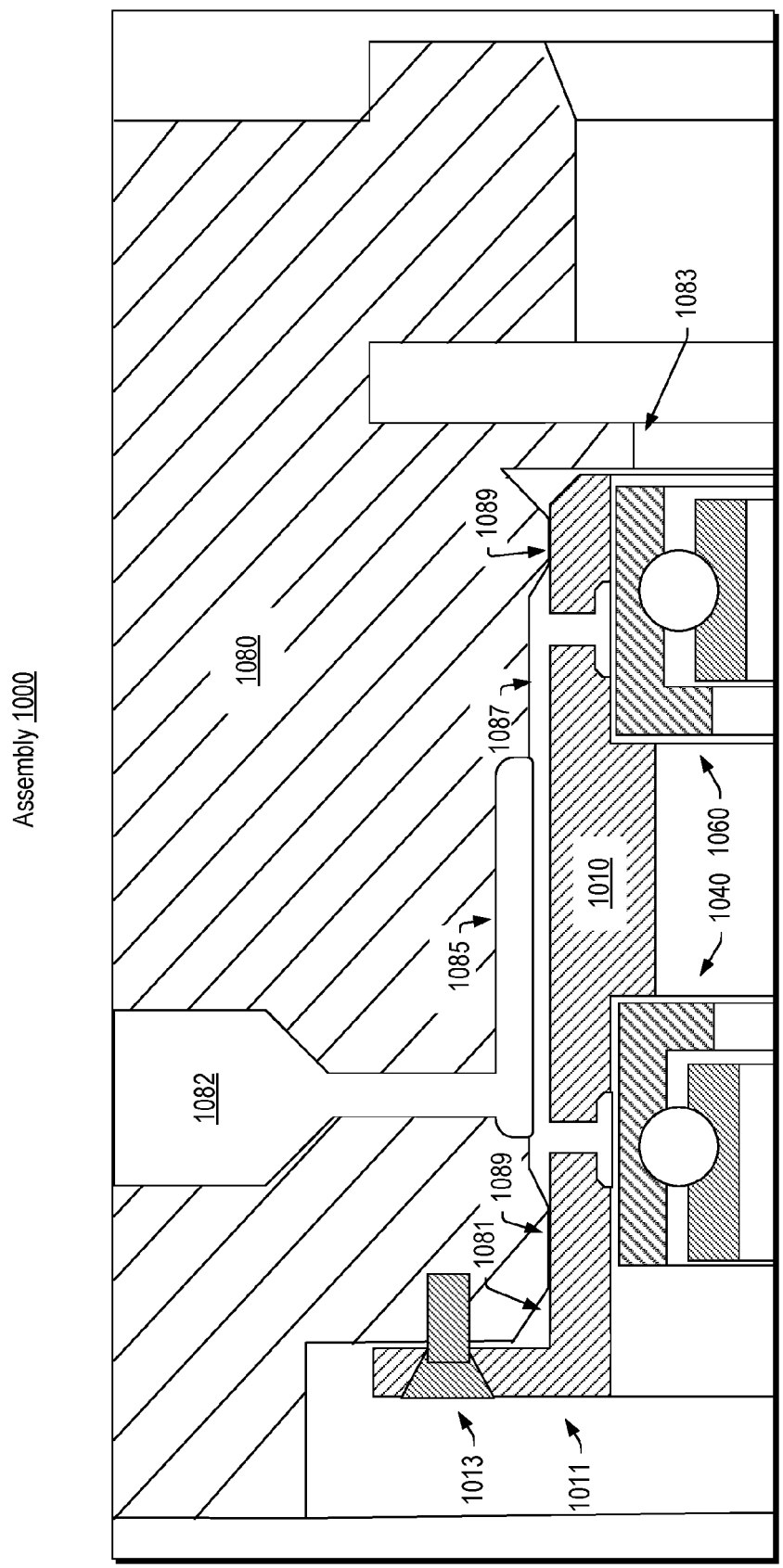
FIG. 10 shows an example of an assembly.

FIG. 10 shows an example of an assembly 1000 that includes a sleeve 1010 with a flange portion 1011, a securing element 1013, bearings 1040 and 1060 and a housing 1080 that includes a bore 1081, a counterbore 1083, lubricant passages 1082 in fluid communication with lubricant distribution features 1085 and 1087. The lubricant passages 1082 of the assembly 1000 include a passage that extends from a surface of the housing 1080 radially toward the bore 1081 of the housing 1080, which may be, for example, machined via a surface of the housing 1080 (e.g., optionally forming a lubricant inlet port). As explained with respect to FIG. 2, various housings described herein can also include a lubricant exit or outlet port (see, e.g., port 289 of FIG. 2).

Various features of the assembly 1000 may be understood with reference to the assembly 900 of FIG. 9 (see also, e.g., FIG. 6 and FIG. 8); noting that the housing 1080 includes the counterbore 1083.

In the example of FIG. 10, the counterbore 1083 may span an azimuthal angle (e.g., an azimuthal span) about a longitudinal axis of the housing 1080 (e.g., a through bore central axis). As an example, the counterbore 1083 may be formed of one or more portions (e.g., arc-span portions). As an example, an axial clearance can exist between a surface of the counterbore 1083 and a turbine end surface of the sleeve 1010. In such an arrangement, the counterbore 1083 may extend radially inwardly to a radius that is less that an inner radius of the sleeve 1010 at the turbine end of the sleeve 1010. For example, the counterbore 1083 may extend radially inwardly to a radius that is less than an outer radius of an outer race of the turbine side bearing 1060 such that a squeeze film formed between the outer race and the sleeve 1010 is at least in part at a radius that is greater than a radius of a radially inward facing surface of the counterbore 1083. In such an example, lubricant exiting the squeeze film may exit axially and contact the counterbore 1083 rather than being ejected axially toward a turbine wheel hub extension seal space formed with respect to a turbine side bore portion of the housing 1080. Such an arrangement may diminish the amount of lubricant that can reach the seal space, which may include one or more piston ring types of seal elements seated in one or more grooves of a SWA.

As an example, a method of assembly can include slightly press-fitting the sleeve 1010 on to the housing 1080 where the sleeve 1010 contacts the pads 1089 in the bore 1081 of the housing 1080 and where the pads 1089 may be of an appropriate axial length, radii, etc.; and axially stopping the sleeve 1010 by contacting or otherwise fixing the flange portion 1011 of the sleeve 1010 with respect to a compressor side surface of the housing 1080 (see, e.g., the securing element 913, which may be a bolt, a screw, etc.) such that the sleeve 1010 extends an axial distance into the bore 1081 of the housing 1080 (e.g., noting that a plurality of securing elements may be employed). As an example, the housing 1080 may be machined with threaded holes that can receive respective bolts.

As an example, the pads 1089 may span about 360 degrees and act to restrict flow of lubricant axially outwardly. For example, a compressor side pad 1089 may restrict flow of lubricant axially outwardly from a lubricant gallery toward the compressor side of the housing 1080 and, for example, a turbine side pad 1089 may restrict flow of lubricant axially outwardly from a lubricant gallery (e.g., a common lubricant gallery) toward the turbine side of the housing 1080.

In the example of FIG. 10, radial grooves may be machined or otherwise formed in the sleeve 1010 (see, e.g., description of various grooves above). In such an example, holes may be drilled that are in fluid communication with the radial grooves. As an example, one or more of the features 1085 and 1087 may be machined into the housing 1080 to form part of a lubricant gallery. For example, the features 1085 and 1087 may be machined into the housing 1080 before the sleeve 1010 is inserted into the housing 1080. As an example, a lubricant gallery may provide for passage of lubricant to a clearance between an outer surface of an outer race of the compressor side bearing 1040 and an inner surface of the sleeve 1010 and provide for passage of lubricant to a clearance between an outer surface of an outer race of the turbine side bearing 1040 and an inner surface of the sleeve 1010. In such an example, holes in the sleeve 1010 may be provided such that the clearances and the lubricant gallery are in fluid communication. Lubricant in such clearances may form lubricant films such as squeeze films (e.g., a compressor bearing squeeze film and a turbine beating squeeze film).

As an example, a method of assembly may include positioning the sleeve 1010 in the bore 1081 of the housing 1080; inserting a SWA and the turbine side bearing 1060 as a sub-assembly into the bore 1081 of the housing 1080 and at least in part into the sleeve 1010 via the turbine side of the housing 1080; inserting a spring (e.g., or a spring assembly) from a compressor side of the housing 1080; and inserting the compressor side bearing 1040.

Figure 11A:
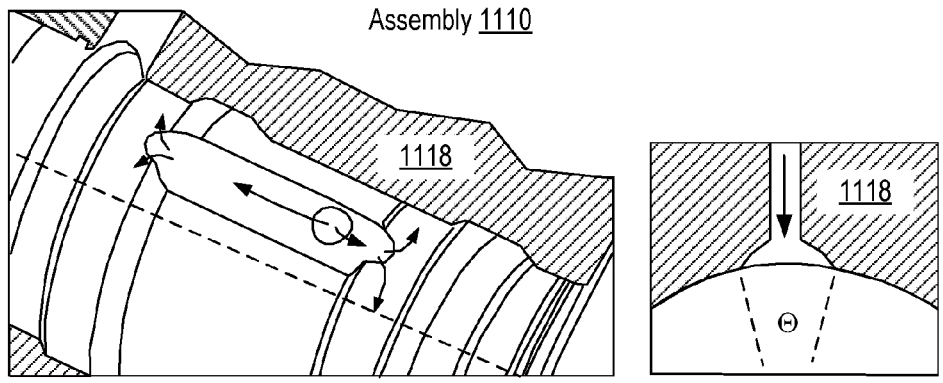
FIGS. 11A, 11B and 11C show examples of lubricant passage features.
Figure 11B:
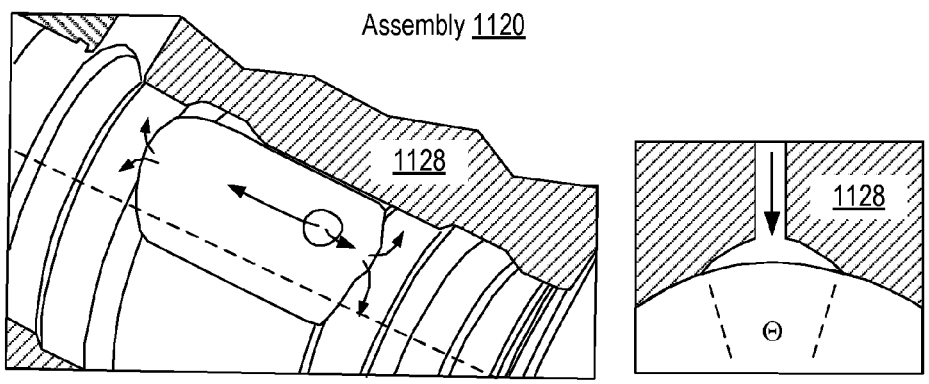
Figure 11C:
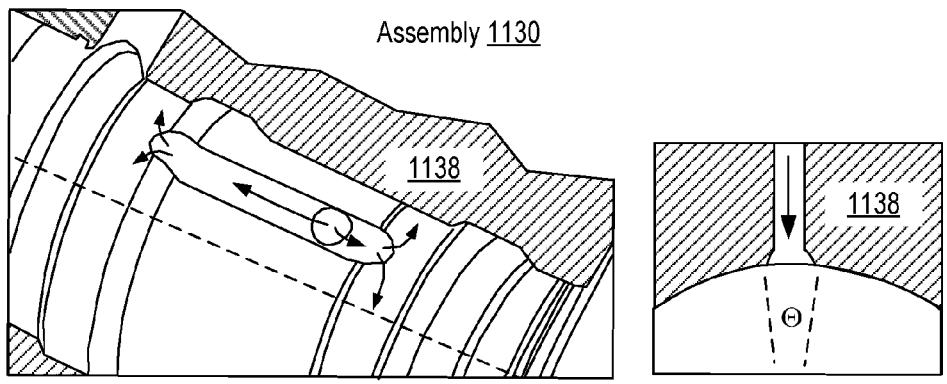

FIGS. 11A, 11B and 11C show examples of assemblies 1110, 1120 and 1130 that include housings 1118, 1128 and 1138 that include lubricant passage features. One or more of such features may be lubricant gallery features. For example, consider the lubricant galleries described with respect to the examples of FIG. 9 and FIG. 10.

As shown in FIGS. 11A, 11B and 11C, a feature of a gallery may be machined with a width (e.g., azimuthal span, denoted Θ) to achieve desirable flow of lubricant that can flow to a compressor side bearing and to a turbine side bearing. As an example, dimensions of a feature of a lubricant gallery may act to restrict flow to a certain degree, to achieve a lubricant pressure profile, to achieve a lubricant flow velocity, to achieve a lubricant residence time, to achieve a thermal profile, etc.

In the examples of FIGS. 11A, 11B and 11C, the housing 1128 has a gallery that is in fluid communication with a lubricant inlet that has an azimuthal span that exceeds that of the gallery of the housing 1118 and the gallery of the housing 1138, which are also in fluid communication with respective lubricant inlets.

As an example, a lubricant inlet may be oriented with respect to gravity such that lubricant flows in the lubricant inlet at least in part due to gravity. In such an example, a lubricant outlet can be at a position about 180 degrees from the lubricant inlet where lubricant can flow in the lubricant outlet at least in part due to gravity. In such an example, lubricant may drain from a housing, for example, after an internal combustion engine is shut down.

As an example, during operation lubricant may flow to a lubricant inlet under pressure, which may be provided by a mechanical and/or electrical lubricant pump (e.g., oil pump, etc.). As an example, a cross-sectional area of a lubricant inlet may be of a shape and size to achieve a desired flow rate, a desired velocity, etc. (e.g., with respect to pressure drop, etc.).

Figure 12:
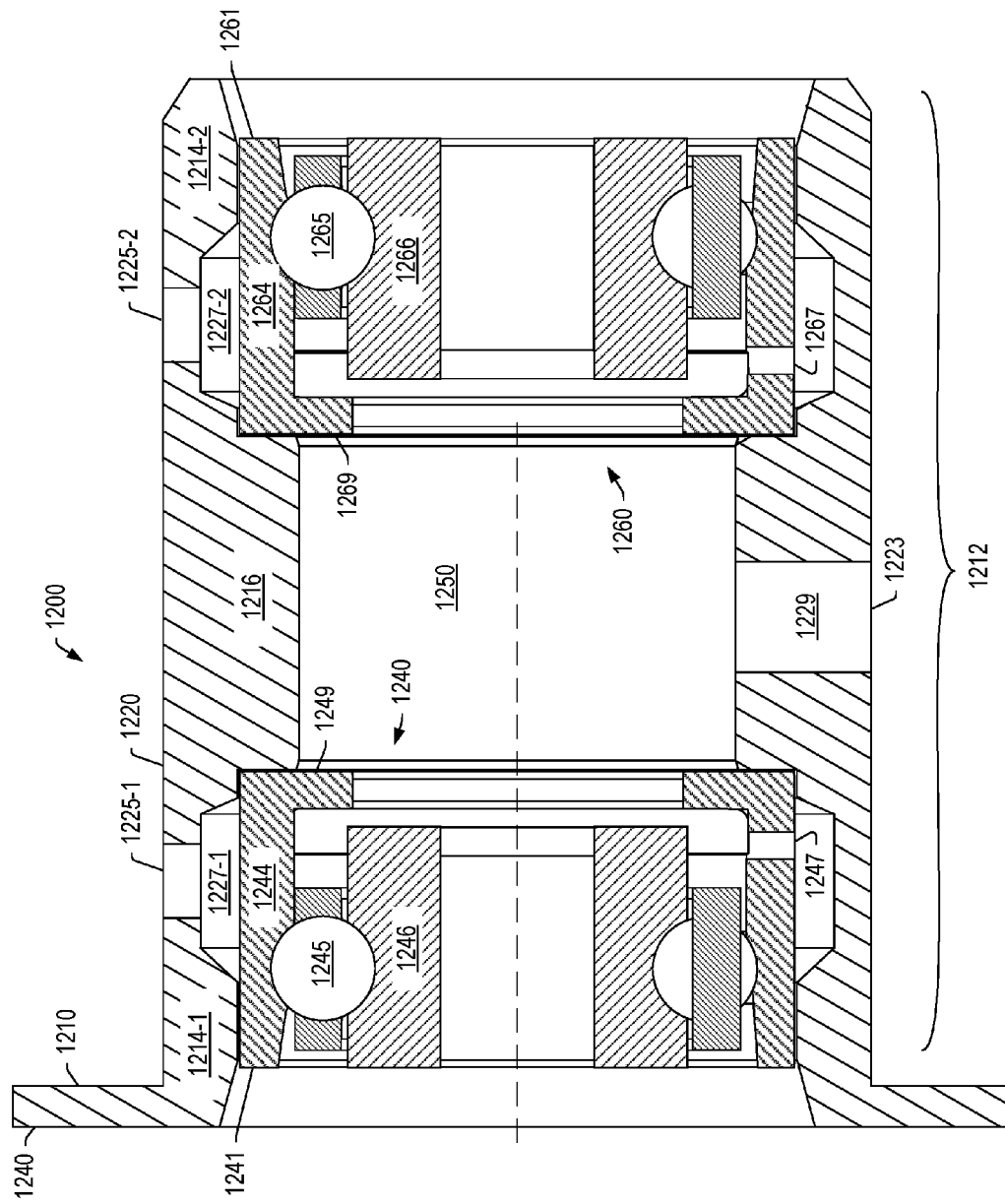
FIG. 12 shows an example of a bearing assembly.

FIG. 12 shows an example of a bearing assembly 1200. In the example of FIG. 12, the assembly 1200 includes a sleeve 1210 and bearings 1240 and 1260. As shown, the sleeve includes a flange portion 1240 and a portion 1212 that extends axially away from the flange portion 1240. As shown, the portion 1212 includes a compressor side wall 1214-1, a turbine side wall 1214-2 and a wall 1216 disposed between the walls 1214-1 and 1214-2. The portion 1212 includes an outer surface 1220 that may be disposed at a radius from a longitudinal axis of the sleeve 1210. As an example, a sleeve can be provided without a flange portion where, for example, a locating mechanism other than such a flange portion may provide for axially locating the sleeve in a though bore of a housing.

As shown, the sleeve 1210 includes openings 1223, 1225-1 and 1225-2, which may provide for flow of lubricant. The opening 1223 is in fluid communication with a passage 1229 that leads to a bore 1250 of the sleeve 1210, the opening 1225-1 is in fluid communication with a passage (e.g., one or more drilled holes, etc.) to a groove 1227-1 and the opening 1225-2 is in fluid communication with a passage (e.g., one or more drilled holes, etc.) to a groove 1227-2.

As shown in the example of FIG. 12, the bearing 1240 can include an outer race 1244, an inner race 1246 and rolling elements 1245 where the outer race 1244 includes one or more openings 1247 and opposing axial faces 1241 and 1249. As an example, lubricant supplied via the opening 1225-1 can flow to the one or more openings 1247 via the groove 1227-1. As an example, lubricant films may form between the outer race 1244 and facing surfaces of the sleeve 1210. For example, consider a fore film and an aft film as fore and aft the groove 1227-1.

As shown in the example of FIG. 12, the bearing 1260 can include an outer race 1264, an inner race 1266 and rolling elements 1265 where the outer race 1264 includes one or more openings 1267 and opposing axial faces 1261 and 1269. As an example, lubricant supplied via the opening 1225-2 can flow to the one or more openings 1267 via the groove 1227-2. As an example, lubricant films may form between the outer race 1264 and facing surfaces of the sleeve 1210. For example, consider a fore film and an aft film as fore and aft the groove 1227-2.

Figure 13A:
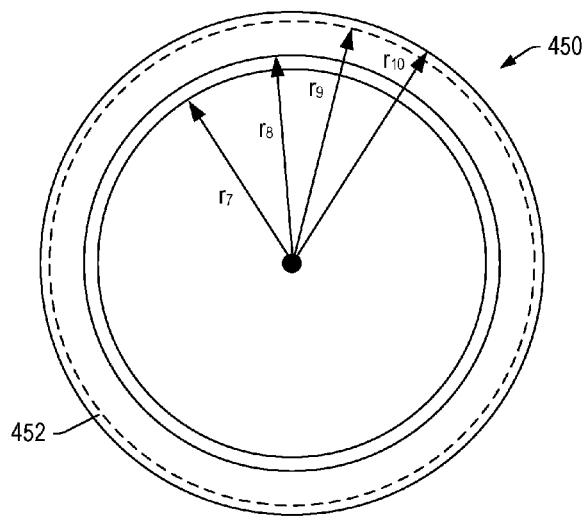
FIGS. 13A, 13B, 13C and 13D show views of an example of a spring of a spring assembly.
Figure 13C:
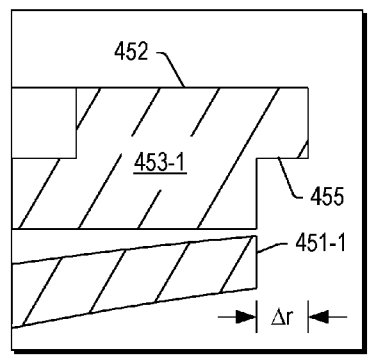
Figure 13B:
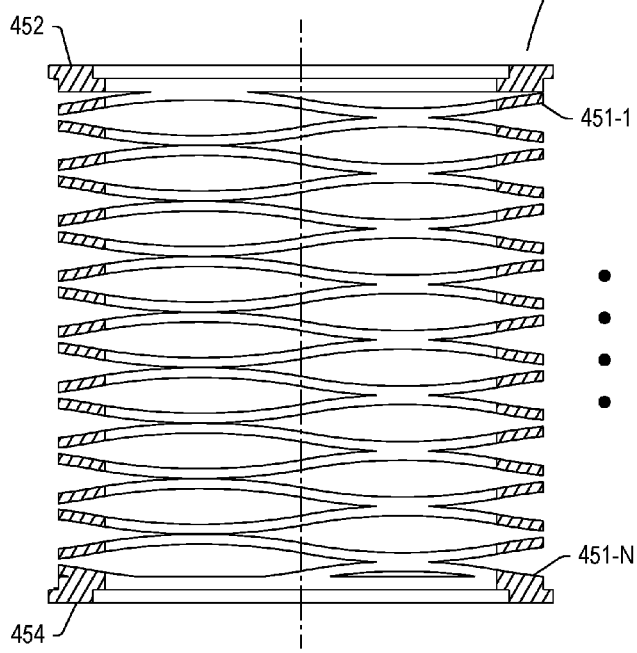
Figure 13D:
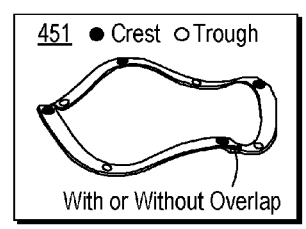

FIGS. 13A, 13B, 13C and 13D show views of an example of the spring 450 that may be, for example, included in a spring assembly. As shown, the spring 450 can include opposing axial facing surfaces 452 and 454 and a number of elements 451-1 to 451-N disposed therebetween. For example, the spring 450 is shown in FIG. 13B as including about 18 elements. FIG. 13D shows an example of an element 451, which may include crests and troughs (e.g., undulations) and be formed as a continuous element, for example, with or without overlapping ends. As shown in FIG. 13A, the spring 450 may be defined in part by various radii $r_7$, $r_8$, $r_9$, and $r_{10}$. As shown in FIG. 13C, the axial facing surface 452 has a radius $r_{10}$ (e.g., or diameter) that exceeds that of an element 451-1 (see, e.g., $r_9$). As shown in FIG. 13C, the axial facing surface 452 is substantially planar and part of an end feature 453-1 of the spring 450 where the end feature 453-1 includes an annular shoulder 455. As an example, the end feature 453-1 may be elastically deformable such that it can be seated within and end cap such as the end cap 430-1 or 430-2 of FIG. 3A. The resiliency of the end feature 453-1 may act to biasably secure the spring 450 with respect to the end cap 430-1 or 430-2, for example, such that the spring 450 does not disengage from the end cap 430-1 or 430-2 during operation of a turbocharger.

Figure 14A:
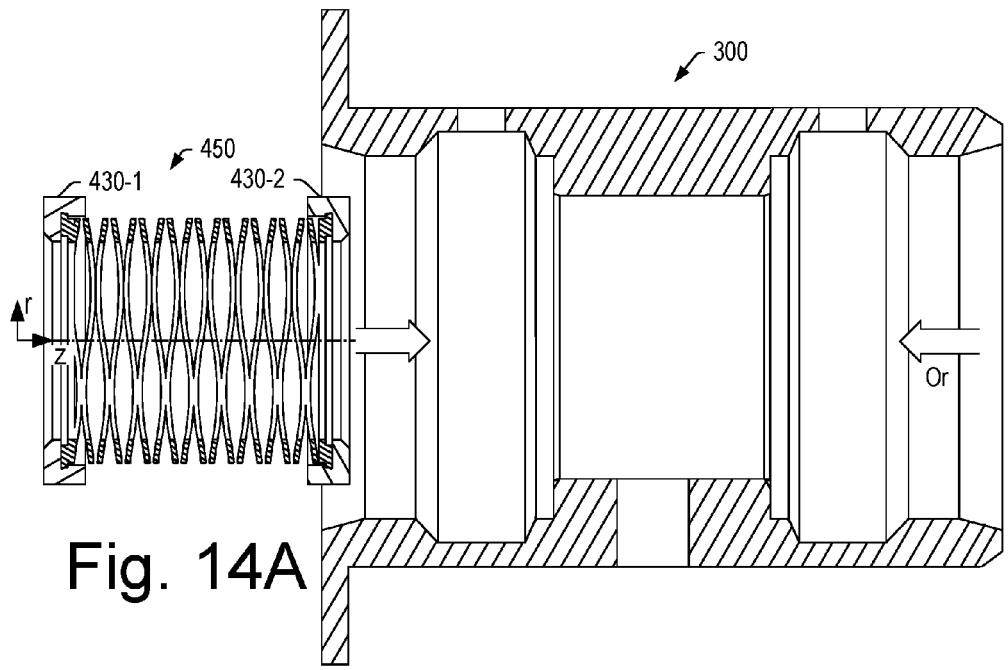
FIGS. 14A and 14B show views of an example of a spring and spacer assembly.
Figure 14B:
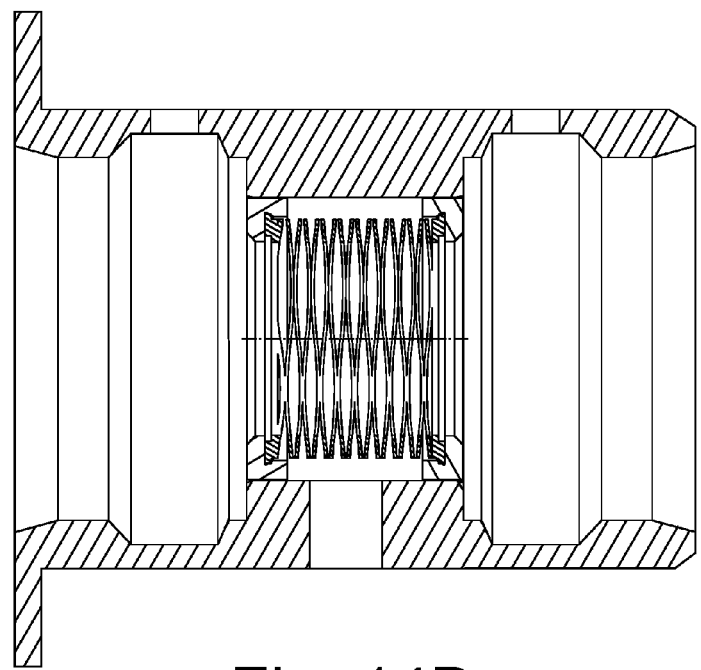

FIGS. 14A and 14B show views of an example of the spring 450 as part of a spring assembly being received by the sleeve 300. As illustrated, the spring and/or spring assembly may be inserted from the compressor side of the sleeve 300, or optionally via the turbine side of the sleeve 300. Insertion of a spring and/or a spring assembly may occur at a desired time during assembly of various components (e.g., after insertion of a shaft and turbine wheel assembly and a turbine side bearing, etc.).

FIGS. 15A to 15K shows examples of housings 1580 and 1582, examples of sleeves 1532, 1534 and 1536 and examples of housing and sleeve assemblies. As shown in FIG. 15A, the housing 1580 can include a radial groove that spans 360 degrees. As shown in FIG. 15B, the housing 1582 can include a groove that has a crescent shape, which spans an angle less than about 360 degrees; noting that a groove may span about 360 degrees and be eccentric with respect to a sleeve mating surface disposed at a diameter (e.g., consider a groove axis being offset from a central axis of a sleeve mating surface). In the examples of FIGS. 15A and 15B, the cross-sectional views of the housings 1580 and 1582 may be for a compressor side and/or for a turbine side.

As shown in FIG. 15C, the sleeve 1532 can include an exterior radial groove and an interior radial groove and at least one passage such that the exterior radial groove and the interior radial groove are in fluid communication (e.g., for passage of lubricant). As shown in FIG. 15D, the sleeve 1534 can include an exterior groove that has a crescent shape, which spans an angle less than about 360 degrees; noting that a groove may span about 360 degrees and be eccentric with respect to a bearing lubricant film formation surface disposed at a diameter (e.g., consider a groove axis being offset from a central axis of a bearing lubricant film formation surface axis). As shown in FIG. 15E, the sleeve 1536 can include an interior groove that has a crescent shape, as well as an exterior groove, which may have a crescent shape (e.g., or another shape). In the examples of FIGS. 15C and 15E, the cross-sectional views of the sleeves 1532, 1534 and 1536 may be for a compressor side and/or for a turbine side (e.g., for lubricant distribution to a squeeze film clearance, etc.).

FIGS. 15F to 15K show various examples of the housings 1580 and 1582 with respect to the sleeves 1532, 1534 and 1536. As an example, one or more of the example assemblies described herein may include one or more of the features of the housings 1580 and 1582 and/or the sleeves 1532, 1534 and 1536 of FIGS. 15A to 15K. Such features include lubricant distribution features, for example, to distribute lubricant to a sleeve.

As an example, a groove may be defined by a radius, a diameter or radii; by an axial dimension or axial dimensions; and by an azimuthal span or azimuthal spans.

Figure 16:
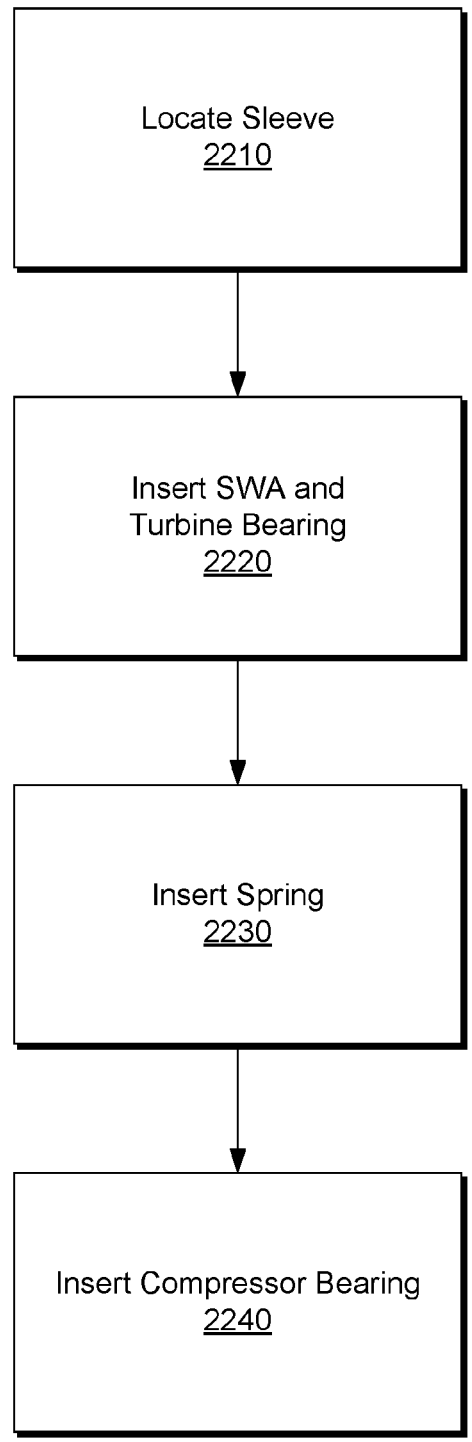
FIG. 16 shows a block diagram of an example of a method.

FIG. 16 shows an example of a method 2200. As shown, the method 2200 includes a location block 2210 for locating a sleeve with respect to a housing, an insertion block 2220 for inserting a shaft and turbine wheel assembly (SWA) and a turbine side bearing with respect to the sleeve and housing, an insertion block 2230 for inserting at least a spring with respect to a spacer portion of the sleeve, and an insertion block 2240 for inserting a compressor side bearing with respect to the sleeve and the spring. As indicated, the sleeve is located (e.g., inserted) into the housing via a compressor side, the SWA and/or the turbine bearing may be, for example, inserted into the housing via a turbine side, the spring or spring assembly may be, for example, inserted into the housing via the compressor side (e.g., or optionally the turbine side) and the compressor side bearing is inserted into the housing via the compressor side.

Figure 17:
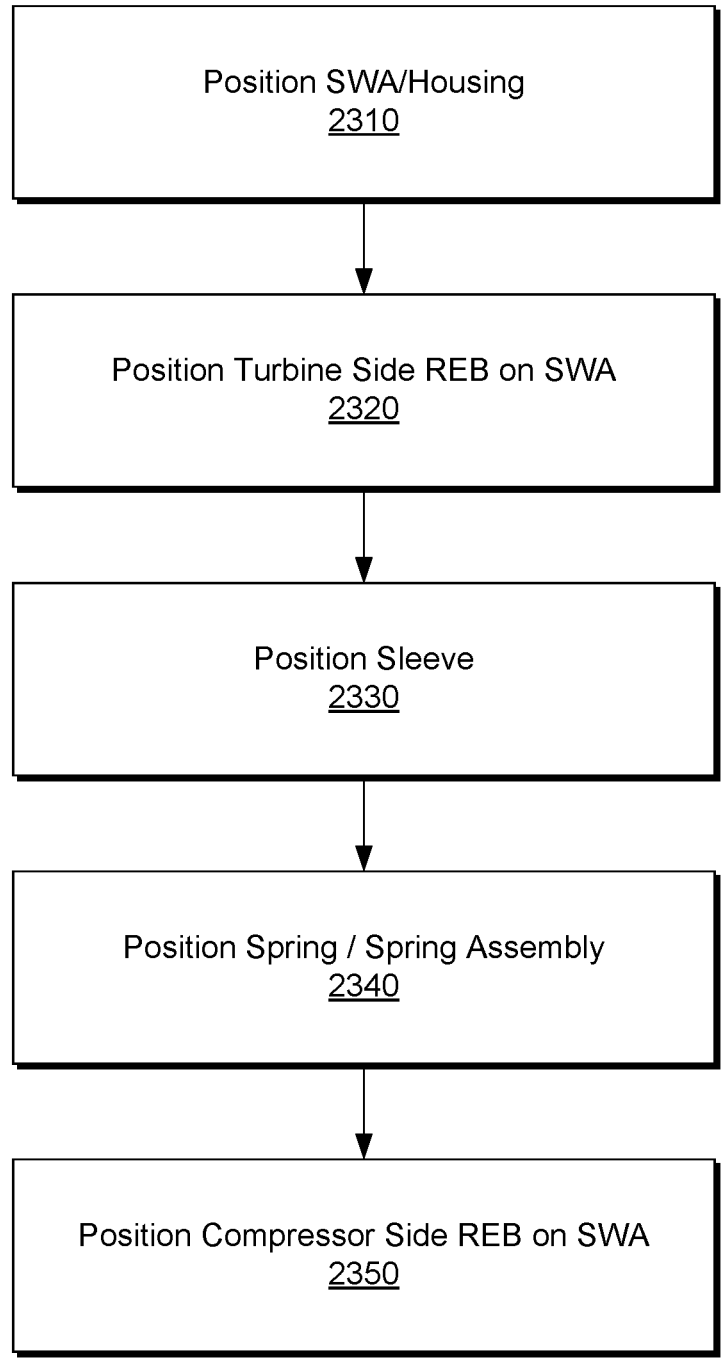
FIG. 17 shows a block diagram of an example of a method.

FIG. 17 shows an example of a method 2300. As shown, the method 2300 includes a position block 2310 for positioning a SWA in a center housing, a position block 2320 for positioning a turbine side rolling element bearing on the SWA (e.g., via a compressor side of the center housing), a position block 2330 for positioning a sleeve in the center housing (e.g., optionally adding one or more components such as, for example, one or more bolts, pins, rings, etc.), a position block 2340 for positioning a spring or spring assembly in the sleeve and a position block 2350 for positioning a compressor side rolling element bearing on the SWA (e.g., and at least in part in the sleeve).

Figure 18:
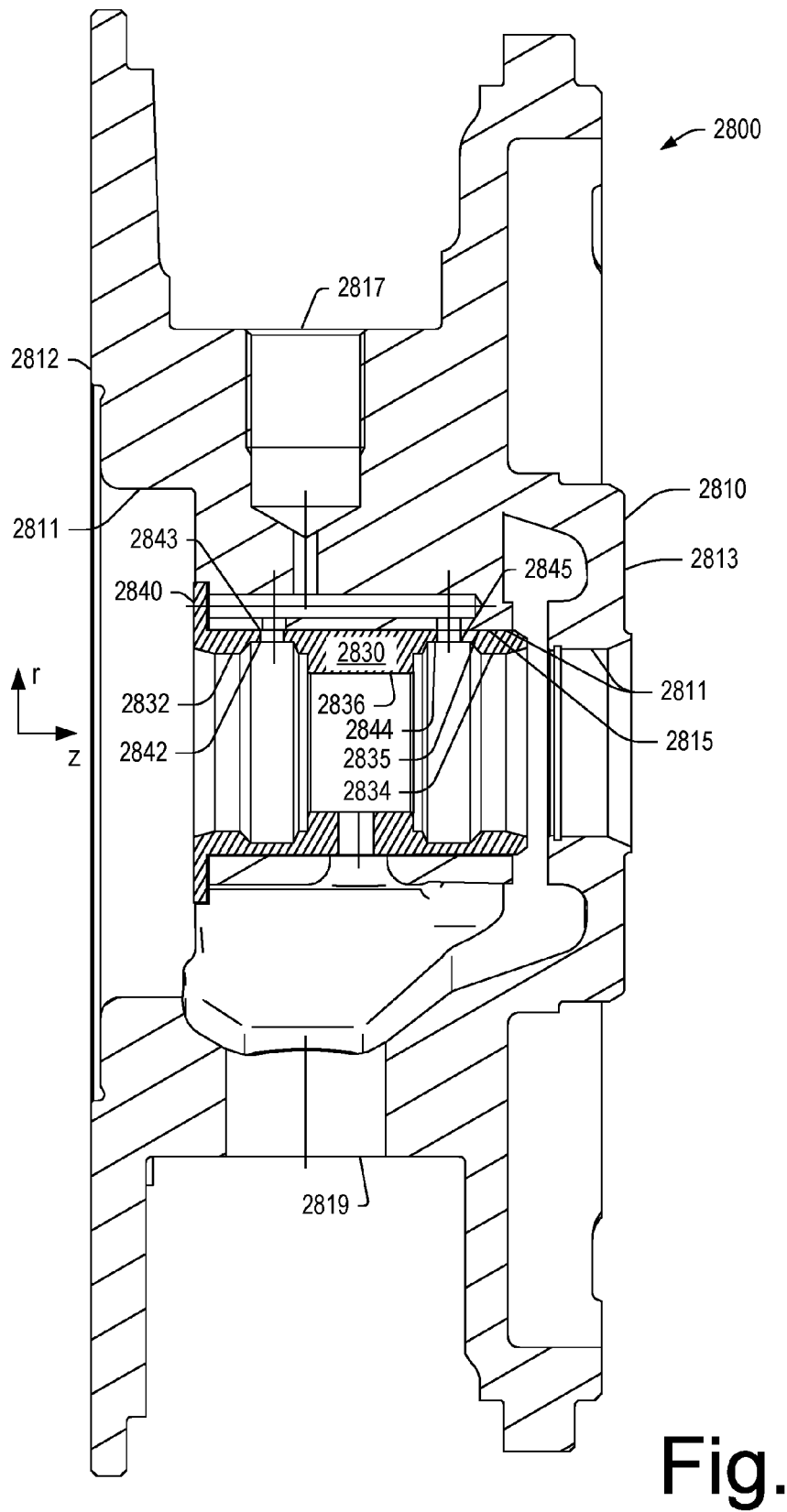
FIG. 18 shows an example of an assembly.

FIG. 18 shows an example of an assembly 2800 that includes a turbocharger center housing 2810 that includes a through bore 2811 that extends between a compressor end 2812 and a turbine end 2813 of the turbocharger center housing 2810 where the through bore 2811 includes a sleeve mating surface 2815; and a sleeve 2830 positioned at least in part in the through bore 2811 of the turbocharger center housing 2810 where the sleeve 2830 includes an outer mating surface 2835, an inner compressor side bearing lubricant film formation surface disposed at a first radius 2832, an inner turbine side bearing lubricant film formation surface disposed at a second radius 2834, and a surface between the inner compressor side bearing lubricant film formation surface and the inner turbine side bearing lubricant film formation surface that includes a third radius 2836 that is less than the first radius and less than the second radius and where outer mating surface 2835 of the sleeve 2830 contacts the sleeve mating surface 2815 of the turbocharger center housing 2810. In such an example, the sleeve 2830 can include a flange 2840 that can act to axially locate the sleeve 2830 in the through bore 2811 of the turbocharger center housing 2810.

In the example assembly 2800, the sleeve 2830 can include grooves such as a compressor side annular groove 2832 (e.g., a radial groove) and a turbine side annular groove 2844 (e.g., a radial groove) where one or more openings include one or more compressor side openings 2843 and one or more turbine side openings 2845 that can allow lubricant to flow to the grooves 2842 and 2844, respectively, where lubricant may flow axially outwardly along the surface 2832 and the surface 2835, respectively (e.g., to form films with respect to bearings). As an example, lubricant can flow into the housing 2810 via an inlet 2817 and flow out of the housing 2810 via an outlet 2819. Various other features of the example assembly 2800 may be understood, for example, with reference to one or more of various other examples presented herein.

As an example, an assembly can include a turbocharger center housing that includes a through bore that extends between a compressor end and a turbine end of the turbocharger center housing where the through bore includes a sleeve mating surface; and a sleeve positioned at least in part in the through bore of the turbocharger center housing where the sleeve includes an outer mating surface, an inner compressor side bearing lubricant film formation surface disposed at a first radius, an inner turbine side bearing lubricant film formation surface disposed at a second radius, and a surface between the inner compressor side bearing lubricant film formation surface and the inner turbine side bearing lubricant film formation surface that includes a third radius that is less than the first radius and less than the second radius and where outer mating surface of the sleeve contacts the sleeve mating surface of the turbocharger center housing. In such an example, the sleeve can include a flange and an axial extension that extends from the flange (e.g., a sleeve portion with various features, etc.).

As an example, a sleeve can include radial grooves. In such an example, one of the radial grooves can be disposed adjacent to an inner compressor side lubricant film formation surface and another one of the radial grooves can be disposed adjacent to the inner turbine side lubricant film formation surface.

As an example, an assembly can include a compressor side bearing that includes an outer race that includes an outer surface that forms a radial clearance with respect to an inner compressor side lubricant film formation surface of a sleeve disposed in a through bore of a turbocharger center housing; and, for example, an assembly can include a turbine side bearing that includes an outer race that includes an outer surface that forms a radial clearance with respect to the inner turbine side lubricant film formation surface. In such an example, the assembly can further include a compressor side lubricant passage that extends between the outer mating surface of the sleeve and the inner compressor bearing lubricant film formation surface of the sleeve. As an example, such an assembly can include a turbine side lubricant passage that extends between the outer mating surface of the sleeve and the inner turbine bearing lubricant film formation surface of the sleeve.

As an example, an assembly can include a compressor side rolling element bearing received by a sleeve, a turbine side rolling element bearing received by the sleeve and a shaft and turbine wheel assembly (SWA) where a first portion of the shaft of the SWA is interference fit to the compressor side rolling element bearing and where a second portion of the shaft of the SWA is interference fit to the turbine side rolling element bearing. In such an example, the assembly can include a spring that applies a biasing force to an outer race of the compressor side rolling element bearing and to an outer race of the turbine side rolling element bearing. In such an example, the assembly can include a compressor housing assembly mounted to the compressor end of the turbocharger center housing and a turbine housing assembly mounted to the turbine end of the turbocharger center housing.

As an example, an assembly can include at least one crescent shaped groove formed into a through bore of a turbocharger center housing where such a groove is at least in part covered by a surface of a sleeve. For example, an outer surface of a sleeve may define a chamber that is crescent shaped where the chamber includes at least one lubricant inlet and at least one lubricant outlet where an inlet is disposed in the housing and where the outlet is disposed in the sleeve. In such an example, the outlet can be in fluid communication with an opening or openings of an outer race of a bearing to direct lubricant to one or more rolling elements of the bearing. As an example, an assembly can include crescent shaped grooves formed into a through bore of a turbocharger center housing where the turbocharger center housing includes at least one lubricant passage that is in fluid communication with the crescent shaped grooves. As an example, a turbocharger center housing can include lubricant passages in fluid communication with a lubricant inlet port of the turbocharger center housing and, for example, in fluid communication with crescent shaped grooves. As an example, a through bore of a turbocharger center housing can include a lubricant outlet in a wall that defines the through bore. For example, such a lubricant outlet may be disposed axially at a location between an axial position of a compressor side rolling element bearing and an axial position of a turbine side rolling element bearing.

As an example, a turbocharger center housing can include a compressor side crescent shaped groove and a turbine side crescent shaped groove and where a sleeve includes a compressor side groove that is at least in part axially aligned with the compressor side crescent shaped groove and a turbine side groove that is at least in part axially aligned with the turbine side crescent shaped groove. In such an example, the compressor side groove of the sleeve can be an exterior groove and the turbine side groove of the sleeve can be an exterior groove.

As an example, a turbocharger center housing can include a lubricant gallery that includes an axial dimension and an azimuthal span. Such a gallery can include one or more openings that are lubricant inlet openings for flow of lubricant from a lubricant inlet of the housing to the gallery. As an example, the gallery may be shaped to provide for flow of lubricant to one or more other openings, which can be, for example, inlet openings of a sleeve where the sleeve includes a bore with portions that can have bearings disposed therein. In such an example, lubricant can flow from the gallery and through openings of the sleeve to the bearings, which can be rolling element bearings. As an example, a rolling element bearing can include an outer race with one or more openings that allow for flow of lubricant radially inwardly to rolling elements.

As an example, a sleeve can include a compressor side lubricant hole (e.g., opening) and a turbine side lubricant hole (e.g., opening) where an axial span between the compressor side lubricant hole and the turbine side lubricant hole is less than an axial length of a lubricant gallery recess of a turbocharger center housing that is recessed radially outwardly from a sleeve mating surface of the turbocharger center housing.

As an example, a chamber may be formed by a gallery of a turbocharger center housing and an outer surface of a sleeve. In such an example, one or more lubricant inlets machined in the turbocharger center housing can allow for flow of lubricant to the gallery and one or more lubricant outlets machined in the sleeve can allow for flow of lubricant from the gallery to one or more bearings.

As an example, a turbocharger center housing can include a counterbore disposed at an axial location between a compressor end and a turbine end of a through bore of the turbocharger center housing. In such an example, an axial clearance can exist between a turbine side axial face at an end of a sleeve disposed at least in part in the through bore and a compressor side axial face of the counterbore. In such an example, the counterbore can include an innermost radius that is less than a radius of a turbine side bearing lubricant film formation surface of the sleeve. As an example, such an assembly can include a turbine side rolling element bearing that includes an outer race that includes an outer surface disposed at a radius that exceeds the innermost radius of the counterbore.

As an example, a counterbore can be a segmented counterbore where each segment spans a respective azimuthal angle. As an example, a turbine end of a sleeve can include recesses. As an example, a counterbore and a sleeve can interact as key and keyway. For example, a counterbore can include key and/or keyway features and a sleeve can include keyway and/or key features. As an example, key and keyway features can orient a sleeve in a through bore of a turbocharger center housing. Such features may limit rotation of the sleeve with respect to the counterbore. As an example, such features may limit axial translation of the sleeve with respect to the counterbore. As an example, such features may limit radial movement of the sleeve with respect to the counterbore. As an example, key and keyway features may limit one or more of azimuthal, axial and radial movement of a sleeve with respect to a counterbore of a turbocharger center housing where the counterbore is within a through bore of the turbocharger center housing and where the sleeve is disposed at least in part in the through bore of the turbocharger center housing.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
   a turbocharger center housing that comprises a through bore that extends between a compressor end and a turbine end of the turbocharger center housing and crescent shaped grooves formed into the through bore of the turbocharger center housing wherein the turbocharger center housing comprises at least one lubricant passage that is in fluid communication with the crescent shaped grooves and wherein the through bore comprises a sleeve mating surface; and
   a sleeve positioned at least in part in the through bore of the turbocharger center housing wherein the sleeve comprises an outer mating surface, an inner compressor side bearing lubricant film formation surface disposed at a first radius, an inner turbine side bearing lubricant film formation surface disposed at a second radius, and a surface between the inner compressor side bearing lubricant film formation surface and the inner turbine side bearing lubricant film formation surface that comprises a third radius that is less than the first radius and less than the second radius and wherein the outer mating surface of the sleeve contacts the sleeve mating surface of the turbocharger center housing.

2. The assembly of claim 1 wherein the sleeve comprises a flange and an axial extension that extends from the flange.

3. The assembly of claim 1 wherein the sleeve comprises radial grooves.

4. The assembly of claim 3 wherein one of the radial grooves is disposed adjacent to the inner compressor side lubricant film formation surface and wherein another one of the radial grooves is disposed adjacent to the inner turbine side lubricant film formation surface.

5. The assembly of claim 1 further comprising a compressor side bearing that comprises an outer race that comprises an outer surface that forms a radial clearance with respect to the inner compressor side lubricant film formation surface; and a turbine side bearing that comprises an outer race that comprises an outer surface that forms a radial clearance with respect to the inner turbine side lubricant film formation surface.

6. The assembly of claim 5 further comprising a compressor side lubricant passage that extends between the outer mating surface of the sleeve and the inner compressor bearing lubricant film formation surface of the sleeve; and a turbine side lubricant passage that extends between the outer mating surface of the sleeve and the inner turbine bearing lubricant film formation surface of the sleeve.

7. The assembly of claim 1 further comprising a compressor side rolling element bearing received by the sleeve, a turbine side rolling element bearing received by the sleeve and a shaft and turbine wheel assembly (SWA) wherein a first portion of the shaft of the SWA is interference fit to the compressor side rolling element bearing and wherein a second portion of the shaft of the SWA is interference fit to the turbine side rolling element bearing.

8. The assembly of claim 7 further comprising a spring that applies a biasing force to an outer race of the compressor side rolling element bearing and to an outer race of the turbine side rolling element bearing.

9. The assembly of claim 1 wherein the turbocharger center housing comprises lubricant passages in fluid communication with a lubricant inlet port of the turbocharger center housing and wherein the through bore comprises a lubricant outlet in a wall that defines the through bore.

10. The assembly of claim 1 wherein the turbocharger center housing comprises a compressor side crescent shaped groove and a turbine side crescent shaped groove and wherein the sleeve comprises a compressor side groove that is at least in part axially aligned with the compressor side crescent shaped groove and a turbine side groove that is at least in part axially aligned with the turbine side crescent shaped groove.

11. The assembly of claim 10 wherein the compressor side groove of the sleeve comprises an exterior groove and wherein the turbine side groove of the sleeve comprises an exterior groove.

12. The assembly of claim 1 wherein the turbocharger center housing comprises a lubricant gallery that comprises an axial dimension and that comprises an azimuthal span and wherein the turbocharger center housing comprises at least one lubricant passage that is in fluid communication with the lubricant gallery.

13. The assembly of claim 1 wherein the sleeve comprises a compressor side lubricant hole and a turbine side lubricant hole wherein an axial span between the compressor side lubricant hole and the turbine side lubricant hole is less than an axial length of a lubricant gallery recess of the turbocharger center housing that is recessed radially outwardly from the sleeve mating surface.

14. The assembly of claim 1 further comprising a counterbore disposed at an axial location between the compressor end and the turbine end of the through bore of the turbocharger center housing.

15. The assembly of claim 14 wherein an axial clearance exists between a turbine side axial face at an end of the sleeve and a compressor side axial face of the counterbore.

16. The assembly of claim 14 wherein the counterbore comprises an innermost radius that is less than a radius of the turbine side bearing lubricant film formation surface of the sleeve.

17. The assembly of claim 16 further comprising a turbine side rolling element bearing that comprises an outer race that comprises an outer surface disposed at a radius that exceeds the innermost radius of the counterbore.

18. The assembly of claim 14 wherein the counterbore comprises a segmented counterbore wherein each segment spans a respective azimuthal angle.

19. An assembly comprising:
a turbocharger center housing that comprises a through bore that extends between a compressor end and a turbine end of the turbocharger center housing wherein the through bore comprises a sleeve mating surface; and
a sleeve positioned at least in part in the through bore of the turbocharger center housing wherein the sleeve comprises an outer mating surface, an inner compressor side bearing lubricant film formation surface disposed at a first radius, an inner turbine side bearing lubricant film formation surface disposed at a second radius, and a surface between the inner compressor side bearing lubricant film formation surface and the inner turbine side bearing lubricant film formation surface that comprises a third radius that is less than the first radius and less than the second radius and wherein the outer mating surface of the sleeve contacts the sleeve mating surface of the turbocharger center housing,
wherein the turbocharger center housing comprises a compressor side crescent shaped groove and a turbine side crescent shaped groove and wherein the sleeve comprises a compressor side groove that is at least in part axially aligned with the compressor side crescent shaped groove and a turbine side groove that is at least in part axially aligned with the turbine side crescent shaped groove.

20. The assembly of claim 19 wherein the compressor side groove of the sleeve comprises an exterior groove and wherein the turbine side groove of the sleeve comprises an exterior groove.

21. An assembly comprising:
a turbocharger center housing that comprises a through bore that extends between a compressor end and a turbine end of the turbocharger center housing wherein the through bore comprises a sleeve mating surface; and
a sleeve positioned at least in part in the through bore of the turbocharger center housing wherein the sleeve comprises an outer mating surface, an inner compressor side bearing lubricant film formation surface disposed at a first radius, an inner turbine side bearing lubricant film formation surface disposed at a second radius, and a surface between the inner compressor side bearing lubricant film formation surface and the inner turbine side bearing lubricant film formation surface that comprises a third radius that is less than the first radius and less than the second radius, wherein the outer mating surface of the sleeve contacts the sleeve mating surface of the turbocharger center housing, wherein the sleeve comprises a compressor side lubricant hole and a turbine side lubricant hole, and wherein an axial span between the compressor side lubricant hole and the turbine side lubricant hole is less than an axial length of a lubricant gallery recess of the turbocharger center housing that is recessed radially outwardly from the sleeve mating surface.

22. An assembly comprising:
a turbocharger center housing that comprises a through bore that extends between a compressor end and a turbine end of the turbocharger center housing and a counterbore disposed at an axial location between the compressor end and the turbine end of the through bore of the turbocharger center housing wherein the through bore comprises a sleeve mating surface and wherein the counterbore comprises a segmented counterbore wherein each segment spans a respective azimuthal angle; and
a sleeve positioned at least in part in the through bore of the turbocharger center housing wherein the sleeve comprises an outer mating surface, an inner compressor side bearing lubricant film formation surface disposed at a first radius, an inner turbine side bearing lubricant film formation surface disposed at a second radius, and a surface between the inner compressor side bearing lubricant film formation surface and the inner turbine side bearing lubricant film formation surface that comprises a third radius that is less than the first radius and less than the second radius and wherein the outer mating surface of the sleeve contacts the sleeve mating surface of the turbocharger center housing.

23. The assembly of claim 22 wherein an axial clearance exists between a turbine side axial face at an end of the sleeve and a compressor side axial face of the counterbore.

24. The assembly of claim 22 wherein the counterbore comprises an innermost radius that is less than a radius of the turbine side bearing lubricant film formation surface of the sleeve.

25. The assembly of claim 24 further comprising a turbine side rolling element bearing that comprises an outer race that comprises an outer surface disposed at a radius that exceeds the innermost radius of the counterbore.

* * * * *